(12) United States Patent
Binder

(10) Patent No.: US 8,270,430 B2
(45) Date of Patent: *Sep. 18, 2012

(54) LOCAL AREA NETWORK OF SERIAL INTELLIGENT CELLS

(75) Inventor: Yehuda Binder, Hod Hasharon (IL)

(73) Assignee: MOSAID Technologies Incorporated, Ottawa, Ontario (CA)

( * ) Notice: Subject to any disclaimer, the term of this patent is extended or adjusted under 35 U.S.C. 154(b) by 613 days.

This patent is subject to a terminal disclaimer.

(21) Appl. No.: 11/593,084

(22) Filed: Nov. 6, 2006

(65) Prior Publication Data

US 2007/0183447 A1 Aug. 9, 2007

Related U.S. Application Data

(60) Continuation of application No. 10/793,769, filed on Mar. 8, 2004, now Pat. No. 7,292,600, which is a division of application No. 10/178,223, filed on Jun. 25, 2002, now Pat. No. 7,016,368, which is a continuation of application No. 09/123,486, filed on Jul. 28, 1998, now Pat. No. 6,480,510.

(51) Int. Cl.
*H04L 12/66* (2006.01)
(52) U.S. Cl. ........................... 370/463; 370/502
(58) Field of Classification Search .................. 370/463, 370/502, 479, 295, 335, 337, 342, 344, 343, 370/347, 436, 441, 34; 340/310.11
See application file for complete search history.

(56) References Cited

U.S. PATENT DOCUMENTS

| | | | |
|---|---|---|---|
| 2,568,342 A | 9/1951 | Koehler et al. |
| 2,680,162 A | 6/1954 | Brehm et al. |
| 3,406,344 A | 10/1968 | Hopper |
| 3,511,936 A | 5/1970 | Saltzberg |
| 3,529,088 A | 9/1970 | Hauer |
| 3,539,727 A | 11/1970 | Pasternack |
| 3,651,471 A | 3/1972 | Hasselwood et al. |
| 3,699,523 A | 10/1972 | Percher |
| 3,723,653 A | 3/1973 | Tatsuzawa |
| 3,806,814 A | 4/1974 | Forbes |
| 3,835,334 A | 9/1974 | Notteau |
| 3,836,888 A | 9/1974 | Boenke et al. |

(Continued)

FOREIGN PATENT DOCUMENTS

DE    33 29 336    12/1983

(Continued)

OTHER PUBLICATIONS

"TeleConcepts . . . Introduces the Just Plug It In Intercom System, "TeleConcepts Brochure, Newington, CT, 2 pages.

(Continued)

*Primary Examiner* — Chi Pham
*Assistant Examiner* — Alexander Boakye
(74) *Attorney, Agent, or Firm* — Browdy and Neimark, PLLC

(57) ABSTRACT

A device for coupling signals between first and second coaxial cables, the first coaxial cable being connected to carry a first bi-directional digital data signal in a first digital data frequency band, and the second coaxial cable being connected to carry a second bi-directional digital data signal in a second digital data frequency band, and each of the coaxial cables being connected to carry, multiplexed with the respective digital data signal, an analog video signal in an analog video signal frequency band distinct from each of the first and second digital data frequency bands.

128 Claims, 9 Drawing Sheets

U.S. PATENT DOCUMENTS

| | | |
|---|---|---|
| 3,870,822 A | 3/1975 | Matthews |
| 3,872,253 A | 3/1975 | Jurschak |
| 3,873,771 A | 3/1975 | Kleinerman et al. |
| 3,875,339 A | 4/1975 | Gruen et al. |
| 3,922,490 A | 11/1975 | Pettis |
| 3,924,077 A | 12/1975 | Blakeslee |
| 3,937,889 A | 2/1976 | Bell, III et al. |
| 3,968,333 A | 7/1976 | Simokat et al. |
| 3,975,594 A | 8/1976 | Guntersdorfer |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,058,678 A | 11/1977 | Dunn et al. |
| 4,063,220 A | 12/1977 | Metcalfe et al. |
| 4,171,467 A | 10/1979 | Evenchik |
| 4,173,714 A | 11/1979 | Bloch et al. |
| 4,197,431 A | 4/1980 | Vis |
| 4,206,320 A | 6/1980 | Keasler et al. |
| 4,232,200 A | 11/1980 | Hestad et al. |
| 4,241,243 A | 12/1980 | Ball |
| 4,254,305 A | 3/1981 | Treiber |
| 4,302,629 A | 11/1981 | Foulkes et al. |
| 4,303,993 A | 12/1981 | Panepinto, Jr. et al. |
| 4,328,579 A | 5/1982 | Hashimoto et al. |
| 4,332,980 A | 6/1982 | Reynolds et al. |
| 4,339,816 A | 7/1982 | Reed |
| 4,373,117 A | 2/1983 | Pierce |
| 4,378,470 A | 3/1983 | Murto et al. |
| 4,387,271 A | 6/1983 | Artom |
| 4,388,489 A | 6/1983 | Wigan et al. |
| 4,393,508 A | 7/1983 | Boudault |
| 4,395,590 A | 7/1983 | Pierce |
| 4,413,229 A | 11/1983 | Grant |
| 4,415,774 A | 11/1983 | Driver |
| 4,417,099 A | 11/1983 | Pierce |
| 4,425,642 A | 1/1984 | Moses et al. |
| 4,431,869 A | 2/1984 | Sweet |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,484,185 A | 11/1984 | Graves |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,509,211 A | 4/1985 | Robbins |
| 4,510,493 A | 4/1985 | Bux et al. |
| 4,521,881 A | 6/1985 | Stapleford et al. |
| 4,523,307 A | 6/1985 | Brown et al. |
| 4,528,422 A | 7/1985 | Cupani |
| 4,543,450 A | 9/1985 | Brandt |
| 4,546,212 A | 10/1985 | Crowder, Sr. |
| 4,551,721 A | 11/1985 | Kozlik |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,533 A | 3/1986 | Pierce |
| 4,578,535 A | 3/1986 | Simmons |
| 4,578,540 A | 3/1986 | Borg et al. |
| 4,580,291 A | 4/1986 | Ab Der Halden |
| 4,583,214 A | 4/1986 | Miyashita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,604,741 A | 8/1986 | Barsellotti |
| 4,608,686 A | 8/1986 | Barsellotti |
| 4,639,714 A | 1/1987 | Crowe |
| 4,642,607 A | 2/1987 | Strom et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,677,646 A | 6/1987 | Dodds et al. |
| 4,679,227 A | 7/1987 | Hughes-Hartogs |
| 4,691,344 A | 9/1987 | Brown et al. |
| 4,709,412 A | 11/1987 | Seymour et al. |
| 4,714,912 A | 12/1987 | Roberts et al. |
| 4,724,435 A | 2/1988 | Moses et al. |
| 4,731,821 A | 3/1988 | Jackson, III |
| 4,733,380 A | 3/1988 | Havira |
| 4,733,389 A | 3/1988 | Puvogel |
| 4,742,538 A | 5/1988 | Szlam |
| 4,745,391 A | 5/1988 | Gajjar |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,761,646 A | 8/1988 | Choquet et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,757 A | 10/1988 | Bryer et al. |
| 4,780,758 A | 10/1988 | Lin et al. |
| 4,782,322 A | 11/1988 | Lechner et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,803,719 A | 2/1989 | Ulrich |
| 4,807,225 A | 2/1989 | Fitch |
| 4,813,066 A | 3/1989 | Holtz et al. |
| 4,814,941 A | 3/1989 | Speet et al. |
| 4,815,106 A | 3/1989 | Propp et al. |
| 4,821,319 A | 4/1989 | Middleton et al. |
| 4,825,349 A | 4/1989 | Marcel |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,866,602 A | 9/1989 | Hall |
| 4,872,197 A | 10/1989 | Pemmaraju |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,316 A | 12/1989 | Walsh et al. |
| 4,893,326 A | 1/1990 | Duran et al. |
| 4,896,349 A | 1/1990 | Kubo |
| 4,901,218 A | 2/1990 | Cornwell |
| 4,901,342 A | 2/1990 | Jones |
| 4,918,688 A | 4/1990 | Krause et al. |
| 4,918,690 A | 4/1990 | Markkula, Jr. et al. |
| 4,922,503 A | 5/1990 | Leone |
| 4,924,492 A | 5/1990 | Gitlin et al. |
| 4,932,022 A | 6/1990 | Keeney et al. |
| 4,932,047 A | 6/1990 | Emmons et al. |
| 4,937,811 A | 6/1990 | Harris |
| 4,939,728 A | 7/1990 | Markkula, Jr. et al. |
| 4,945,404 A | 7/1990 | Miller |
| 4,947,483 A | 8/1990 | Dirr |
| 4,947,484 A | 8/1990 | Twitty et al. |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlain et al. |
| 4,969,147 A | 11/1990 | Markkula, Jr. et al. |

| Patent No. | Date | Inventor |
|---|---|---|
| 4,973,954 A | 11/1990 | Schwarz |
| 4,975,896 A | 12/1990 | D'Agosto, III et al. |
| 4,975,903 A | 12/1990 | Wakerly et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,996,709 A | 2/1991 | Heep et al. |
| 5,010,399 A | 4/1991 | Goodman et al. |
| 5,014,308 A | 5/1991 | Fox |
| 5,018,138 A | 5/1991 | Twitty et al. |
| 5,025,443 A | 6/1991 | Gupta |
| 5,032,819 A | 7/1991 | Sakuragi et al. |
| 5,033,062 A | 7/1991 | Morrow et al. |
| 5,034,883 A | 7/1991 | Donaldson et al. |
| 5,034,948 A | 7/1991 | Mizutani et al. |
| 5,036,513 A | 7/1991 | Greenblatt |
| 5,051,822 A | 9/1991 | Rhoades |
| 5,063,563 A | 11/1991 | Ikeda et al. |
| 5,065,133 A | 11/1991 | Howard |
| 5,068,890 A | 11/1991 | Nilssen |
| 5,089,886 A | 2/1992 | Grandmougin |
| 5,090,052 A | 2/1992 | Nakajima et al. |
| 5,095,417 A | 3/1992 | Hagiwara et al. |
| 5,095,497 A | 3/1992 | Aman et al. |
| 5,113,498 A | 5/1992 | Evan et al. |
| 5,125,077 A | 6/1992 | Hall |
| 5,136,580 A | 8/1992 | Videlock et al. |
| 5,144,544 A | 9/1992 | Jenneve et al. |
| 5,148,144 A | 9/1992 | Sutterlin et al. |
| 5,150,365 A | 9/1992 | Hirata et al. |
| 5,157,711 A | 10/1992 | Shimanuki |
| 5,175,764 A | 12/1992 | Patel et al. |
| 5,179,586 A | 1/1993 | Lee |
| 5,181,240 A | 1/1993 | Sakuragi et al. |
| 5,210,788 A | 5/1993 | Nilssen |
| 5,216,704 A | 6/1993 | Williams et al. |
| 5,220,561 A | 6/1993 | Nuhn et al. |
| 5,220,597 A | 6/1993 | Horiuchi |
| 5,224,154 A | 6/1993 | Aldridge et al. |
| 5,247,347 A | 9/1993 | Litteral et al. |
| 5,255,267 A | 10/1993 | Hansen et al. |
| 5,257,006 A | 10/1993 | Graham et al. |
| 5,274,631 A | 12/1993 | Bhardwaj |
| 5,283,637 A | 2/1994 | Goolcharan |
| 5,289,359 A | 2/1994 | Ziermann |
| 5,289,461 A | 2/1994 | De Nijs |
| 5,297,141 A | 3/1994 | Marum |
| 5,311,114 A | 5/1994 | Sambamurthy et al. |
| 5,311,518 A | 5/1994 | Takato et al. |
| 5,311,593 A | 5/1994 | Carmi |
| 5,323,461 A | 6/1994 | Rosenbaum et al. |
| 5,341,370 A | 8/1994 | Nuhn et al. |
| 5,343,240 A | 8/1994 | Yu |
| 5,343,514 A | 8/1994 | Snyder |
| 5,347,549 A | 9/1994 | Baumann |
| 5,351,272 A | 9/1994 | Abraham |
| 5,353,334 A | 10/1994 | O'Sullivan |
| 5,356,311 A | 10/1994 | Liu |
| 5,363,432 A | 11/1994 | Martin et al. |
| 5,379,005 A | 1/1995 | Aden et al. |
| 5,391,932 A | 2/1995 | Small et al. |
| 5,400,068 A | 3/1995 | Ishida et al. |
| 5,404,127 A | 4/1995 | Lee et al. |
| 5,406,249 A | 4/1995 | Pettus |
| 5,406,260 A | 4/1995 | Cummings et al. |
| 5,408,260 A | 4/1995 | Arnon |
| 5,410,343 A | 4/1995 | Coddington et al. |
| 5,414,708 A | 5/1995 | Webber et al. |
| 5,420,572 A | 5/1995 | Dolin, Jr. et al. |
| 5,420,578 A | 5/1995 | O'Brien et al. |
| 5,420,886 A | 5/1995 | Ohmori |
| 5,421,030 A | 5/1995 | Baran |
| 5,422,929 A | 6/1995 | Hurst et al. |
| 5,424,710 A | 6/1995 | Baumann |
| 5,428,682 A | 6/1995 | Apfel |
| 5,440,335 A | 8/1995 | Beveridge |
| 5,446,905 A | 8/1995 | Koshiishi |
| 5,452,289 A | 9/1995 | Sharma et al. |
| 5,454,008 A | 9/1995 | Baumann et al. |
| 5,461,671 A | 10/1995 | Sakuragi et al. |
| 5,463,616 A | 10/1995 | Kruse et al. |
| 5,467,384 A | 11/1995 | Skinner, Sr. |
| 5,471,190 A * | 11/1995 | Zimmermann ......... 340/310.11 |
| 5,475,687 A | 12/1995 | Markkula, Jr. et al. |
| 5,483,574 A | 1/1996 | Yuyama |
| 5,487,066 A | 1/1996 | McNamara et al. |
| 5,491,463 A | 2/1996 | Sargeant et al. |
| 5,499,241 A | 3/1996 | Thompson et al. |
| 5,504,454 A | 4/1996 | Daggett et al. |
| 5,528,507 A | 6/1996 | McNamara et al. |
| 5,530,748 A | 6/1996 | Ohmori |
| 5,535,336 A | 7/1996 | Smith et al. |
| 5,539,805 A | 7/1996 | Bushue et al. |
| 5,544,164 A | 8/1996 | Baran |
| 5,544,243 A | 8/1996 | Papadopoulos |
| 5,546,385 A | 8/1996 | Caspi et al. |
| 5,548,592 A | 8/1996 | Komarek et al. |
| 5,548,614 A | 8/1996 | Stoll et al. |
| 5,550,836 A | 8/1996 | Albrecht et al. |
| 5,553,063 A | 9/1996 | Dickson |
| 5,553,138 A | 9/1996 | Heald et al. |
| 5,568,547 A | 10/1996 | Nishimura |
| 5,570,085 A | 10/1996 | Bertsch |
| 5,574,748 A | 11/1996 | Vander Mey et al. |
| 5,579,221 A | 11/1996 | Mun |
| 5,581,801 A | 12/1996 | Spriester et al. |
| 5,583,934 A | 12/1996 | Zhou |
| 5,587,692 A | 12/1996 | Graham et al. |
| 5,594,726 A | 1/1997 | Thompson et al. |
| 5,594,732 A | 1/1997 | Bell et al. |
| 5,608,792 A | 3/1997 | Laidler |
| 5,610,916 A | 3/1997 | Kostreski et al. |
| 5,610,922 A | 3/1997 | Balatoni |
| 5,621,455 A | 4/1997 | Rogers et al. |
| 5,625,863 A | 4/1997 | Abraham |
| 5,646,983 A | 7/1997 | Suffern et al. |
| 5,651,696 A | 7/1997 | Jennison |
| 5,652,893 A | 7/1997 | Ben-Meir et al. |
| 5,659,608 A | 8/1997 | Stiefel |
| 5,671,220 A | 9/1997 | Tonomura |
| 5,675,375 A | 10/1997 | Riffee |
| 5,682,423 A | 10/1997 | Walker |
| 5,684,826 A | 11/1997 | Ratner |
| 5,696,790 A | 12/1997 | Graham et al. |
| 5,706,007 A | 1/1998 | Fragnito et al. |
| 5,706,157 A | 1/1998 | Galecki et al. |
| 5,708,701 A | 1/1998 | Houvig et al. |
| 5,712,614 A | 1/1998 | Patel et al. |
| 5,742,527 A | 4/1998 | Rybicki et al. |
| 5,748,634 A | 5/1998 | Sokol et al. |
| 5,754,539 A | 5/1998 | Metz et al. |
| 5,757,803 A | 5/1998 | Russell et al. |
| 5,774,789 A | 6/1998 | Van Der Kaay et al. |
| 5,777,769 A | 7/1998 | Coutinho |
| 5,778,303 A | 7/1998 | Shinozaki et al. |
| 5,787,115 A | 7/1998 | Turnbull et al. |
| 5,796,739 A | 8/1998 | Kim |
| 5,799,069 A | 8/1998 | Weston et al. |
| 5,801,635 A | 9/1998 | Price |
| 5,802,173 A | 9/1998 | Hamilton-Piercy et al. |
| 5,802,283 A | 9/1998 | Grady et al. |
| 5,805,053 A | 9/1998 | Patel et al. |
| 5,805,597 A | 9/1998 | Edem |
| 5,805,806 A | 9/1998 | McArthur |
| 5,812,786 A | 9/1998 | Seazholtz et al. |
| 5,815,681 A | 9/1998 | Kikinis |
| 5,818,710 A | 10/1998 | LeVan Suu |
| 5,818,725 A | 10/1998 | McNamara et al. |
| 5,818,821 A | 10/1998 | Schurig |
| 5,822,677 A | 10/1998 | Peyrovian |
| 5,822,678 A | 10/1998 | Evanyk |
| 5,835,005 A | 11/1998 | Furukawa et al. |
| 5,841,360 A | 11/1998 | Binder |
| 5,841,840 A | 11/1998 | Smith et al. |
| 5,841,841 A | 11/1998 | Dodds et al. |
| 5,842,032 A | 11/1998 | Bertsch |
| 5,844,596 A | 12/1998 | Goodman |

| | | |
|---|---|---|
| 5,844,888 A | 12/1998 | Markkula et al. |
| 5,845,190 A | 12/1998 | Bushue et al. |
| 5,845,201 A | 12/1998 | Funke et al. |
| 5,848,054 A | 12/1998 | Mosebrook et al. |
| 5,848,150 A | 12/1998 | Bingel |
| D404,721 S | 1/1999 | Tennefoss et al. |
| D405,422 S | 2/1999 | Tennefoss et al. |
| 5,878,047 A | 3/1999 | Ganek et al. |
| 5,878,133 A | 3/1999 | Zhou et al. |
| 5,884,086 A | 3/1999 | Amoni et al. |
| 5,886,732 A | 3/1999 | Humpleman |
| 5,892,792 A | 4/1999 | Walley |
| 5,896,443 A | 4/1999 | Dichter |
| 5,896,556 A | 4/1999 | Moreland et al. |
| 5,903,213 A | 5/1999 | Hodge et al. |
| 5,912,895 A | 6/1999 | Terry et al. |
| 5,917,624 A | 6/1999 | Wagner |
| 5,929,896 A | 7/1999 | Goodman |
| 5,930,340 A | 7/1999 | Bell |
| 5,938,757 A | 8/1999 | Bertsch |
| 5,940,400 A | 8/1999 | Eastmond et al. |
| 5,949,473 A | 9/1999 | Goodman |
| 5,949,476 A | 9/1999 | Pocock et al. |
| 5,960,066 A | 9/1999 | Hartmann et al. |
| 5,963,539 A | 10/1999 | Webber, Jr. et al. |
| 5,963,595 A | 10/1999 | Graham et al. |
| 5,963,844 A | 10/1999 | Dail |
| 5,982,784 A | 11/1999 | Bell |
| 5,990,577 A | 11/1999 | Kamioka et al. |
| 5,991,831 A | 11/1999 | Lee et al. |
| 5,991,885 A | 11/1999 | Chang et al. |
| 5,994,998 A | 11/1999 | Fisher et al. |
| 5,995,598 A | 11/1999 | Berstis |
| 5,999,612 A | 12/1999 | Dunn et al. |
| 6,002,722 A | 12/1999 | Wu |
| 6,005,873 A | 12/1999 | Amit |
| 6,009,465 A | 12/1999 | Decker et al. |
| 6,009,479 A | 12/1999 | Jeffries |
| 6,011,794 A | 1/2000 | Mordowitz et al. |
| 6,026,078 A | 2/2000 | Smith |
| 6,026,150 A | 2/2000 | Frank |
| 6,038,425 A | 3/2000 | Jeffrey |
| 6,052,380 A | 4/2000 | Bell |
| 6,061,357 A | 5/2000 | Olshansky et al. |
| 6,061,392 A | 5/2000 | Bremer et al. |
| 6,064,673 A | 5/2000 | Anderson et al. |
| 6,069,588 A | 5/2000 | O'Neill, Jr. |
| 6,069,899 A | 5/2000 | Foley |
| 6,081,519 A | 6/2000 | Petler |
| 6,081,533 A | 6/2000 | Laubach et al. |
| 6,087,860 A | 7/2000 | Liu et al. |
| 6,088,368 A | 7/2000 | Rubinstain et al. |
| 6,094,441 A | 7/2000 | Jung et al. |
| 6,107,912 A | 8/2000 | Bullock et al. |
| 6,108,330 A | 8/2000 | Bhatia et al. |
| 6,109,959 A | 8/2000 | Burlinson et al. |
| 6,111,764 A | 8/2000 | Atou et al. |
| 6,112,232 A | 8/2000 | Shahar et al. |
| 6,115,468 A | 9/2000 | DeNicolo |
| 6,115,755 A | 9/2000 | Krishan |
| 6,123,577 A | 9/2000 | Contois et al. |
| 6,130,893 A | 10/2000 | Whittaker et al. |
| 6,130,896 A | 10/2000 | Lueker et al. |
| 6,137,865 A | 10/2000 | Ripy et al. |
| 6,141,356 A | 10/2000 | Gorman |
| 6,144,292 A | 11/2000 | Brown |
| 6,151,480 A | 11/2000 | Fischer et al. |
| 6,157,645 A | 12/2000 | Shobatake |
| 6,157,716 A | 12/2000 | Ortel |
| 6,167,120 A | 12/2000 | Kikinis |
| 6,175,556 B1 | 1/2001 | Allen, Jr. et al. |
| 6,175,860 B1 | 1/2001 | Gaucher |
| 6,178,455 B1 | 1/2001 | Schutte et al. |
| 6,181,783 B1 | 1/2001 | Goodman |
| 6,185,284 B1 | 2/2001 | Goodman |
| 6,188,557 B1 | 2/2001 | Chaudhry |
| 6,192,399 B1 | 2/2001 | Goodman |
| 6,195,339 B1 | 2/2001 | Erite et al. |
| 6,202,211 B1 | 3/2001 | Williams, Jr. |
| 6,205,495 B1 | 3/2001 | Gilbert et al. |
| 6,208,637 B1 | 3/2001 | Eames |
| 6,212,227 B1 | 4/2001 | Ko et al. |
| 6,212,274 B1 | 4/2001 | Ninh |
| 6,215,789 B1 | 4/2001 | Keenan et al. |
| 6,216,160 B1 | 4/2001 | Dichter |
| 6,218,930 B1 | 4/2001 | Katzenberg et al. |
| 6,219,409 B1 | 4/2001 | Smith et al. |
| 6,227,499 B1 | 5/2001 | Jennison et al. |
| 6,236,653 B1 | 5/2001 | Dalton et al. |
| 6,236,664 B1 | 5/2001 | Erreygers |
| 6,236,718 B1 | 5/2001 | Goodman |
| 6,240,166 B1 | 5/2001 | Collin et al. |
| 6,243,413 B1 | 6/2001 | Beukema |
| 6,243,446 B1 | 6/2001 | Goodman |
| 6,246,748 B1 | 6/2001 | Yano |
| 6,252,754 B1 | 6/2001 | Chaudhry |
| 6,252,957 B1 | 6/2001 | Jauregui et al. |
| 6,256,518 B1 | 7/2001 | Buhrmann |
| 6,282,075 B1 | 8/2001 | Chaudhry |
| 6,282,189 B1 | 8/2001 | Eames |
| 6,292,467 B1 | 9/2001 | Keller |
| 6,292,517 B1 | 9/2001 | Jeffress et al. |
| 6,295,356 B1 | 9/2001 | De Nicolo |
| 6,310,894 B1 | 10/2001 | Counterman |
| 6,317,884 B1 | 11/2001 | Eames et al. |
| 6,320,866 B2 | 11/2001 | Wolf et al. |
| 6,320,900 B1 | 11/2001 | Liu |
| 6,324,268 B1 | 11/2001 | Balachandran et al. |
| 6,349,133 B1 | 2/2002 | Matthews et al. |
| 6,364,535 B1 | 4/2002 | Coffey |
| 6,370,149 B1 | 4/2002 | Gorman et al. |
| 6,383,076 B1 | 5/2002 | Tiedeken |
| 6,389,125 B1 | 5/2002 | Ubowski |
| 6,393,050 B1 | 5/2002 | Liu |
| 6,396,391 B1 | 5/2002 | Binder |
| 6,408,351 B1 | 6/2002 | Hamdi et al. |
| 6,414,952 B2 | 7/2002 | Foley |
| 6,418,558 B1 | 7/2002 | Roberts et al. |
| 6,424,661 B1 | 7/2002 | Bentley |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,448,899 B1 | 9/2002 | Thompson |
| 6,449,318 B1 | 9/2002 | Rumbaugh |
| 6,449,348 B1 | 9/2002 | Lamb et al. |
| 6,470,053 B1 | 10/2002 | Liu |
| 6,473,495 B1 | 10/2002 | Willer |
| 6,473,608 B1 | 10/2002 | Lehr et al. |
| 6,480,510 B1 | 11/2002 | Binder |
| 6,481,013 B1 | 11/2002 | Dinwiddie et al. |
| 6,483,902 B1 | 11/2002 | Stewart et al. |
| 6,493,875 B1 | 12/2002 | Eames et al. |
| 6,510,204 B2 | 1/2003 | De Clercq et al. |
| 6,518,724 B2 | 2/2003 | Janik |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,587 B1 | 3/2003 | Kobayashi |
| 6,539,011 B1 | 3/2003 | Keenan et al. |
| 6,541,878 B1 | 4/2003 | Diab |
| 6,542,585 B2 | 4/2003 | Goodman |
| 6,549,616 B1 | 4/2003 | Binder |
| 6,556,581 B1 | 4/2003 | He et al. |
| 6,560,319 B1 | 5/2003 | Binder |
| 6,560,333 B1 | 5/2003 | Consiglio et al. |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,577,882 B1 | 6/2003 | Roos |
| 6,580,254 B2 | 6/2003 | Schofield |

| | | |
|---|---|---|
| 6,580,710 B1 | 6/2003 | Bowen et al. |
| 6,580,785 B2 | 6/2003 | Bremer et al. |
| 6,584,197 B1 | 6/2003 | Boudreaux, Jr. et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,587,560 B1 | 7/2003 | Scott et al. |
| 6,601,097 B1 | 7/2003 | Cheston et al. |
| 6,603,808 B1 | 8/2003 | Anne et al. |
| 6,616,005 B1 | 9/2003 | Pereira et al. |
| 6,640,308 B1 | 10/2003 | Keyghobad et al. |
| 6,650,662 B1 | 11/2003 | Arnaud et al. |
| 6,653,932 B1 | 11/2003 | Beamish et al. |
| 6,658,098 B2 | 12/2003 | Lamb et al. |
| 6,658,108 B1 | 12/2003 | Bissell et al. |
| 6,665,404 B2 | 12/2003 | Cohen |
| 6,678,321 B1 | 1/2004 | Graham et al. |
| 6,678,721 B1 | 1/2004 | Bell |
| 6,681,013 B1 | 1/2004 | Miyamoto |
| 6,690,677 B1 | 2/2004 | Binder |
| 6,690,792 B1 | 2/2004 | Robinson et al. |
| 6,693,916 B1 | 2/2004 | Chaplik et al. |
| 6,697,358 B2 | 2/2004 | Bernstein |
| 6,701,406 B1 | 3/2004 | Chang et al. |
| 6,704,824 B1 | 3/2004 | Goodman |
| 6,710,704 B2 | 3/2004 | Fisher et al. |
| 6,711,138 B1 | 3/2004 | Pai et al. |
| 6,721,365 B1 | 4/2004 | Yin et al. |
| 6,721,419 B1 | 4/2004 | Stell et al. |
| 6,721,790 B1 | 4/2004 | Chen |
| 6,732,315 B2 | 5/2004 | Yagil et al. |
| 6,735,217 B1 | 5/2004 | Webber, Jr. et al. |
| 6,738,382 B1 | 5/2004 | West et al. |
| 6,738,597 B1 | 5/2004 | Jeung et al. |
| 6,747,859 B2 | 6/2004 | Walbeck et al. |
| 6,748,078 B1 | 6/2004 | Posthuma |
| 6,754,186 B1 | 6/2004 | Bullman |
| 6,763,097 B1 | 7/2004 | Vitenberg |
| 6,763,109 B1 | 7/2004 | Hoskins |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,299 B1 | 8/2004 | Olson et al. |
| 6,778,549 B1 | 8/2004 | Keller |
| 6,778,646 B1 | 8/2004 | Sun |
| 6,785,296 B1 | 8/2004 | Bell |
| 6,795,539 B2 | 9/2004 | Culli et al. |
| 6,815,844 B2 | 11/2004 | Kovarik |
| 6,819,760 B1 | 11/2004 | Nayler |
| 6,831,975 B1 | 12/2004 | Easwaran et al. |
| 6,831,976 B1 | 12/2004 | Comerford et al. |
| 6,836,546 B1 | 12/2004 | Willer |
| 6,839,345 B2 | 1/2005 | Lu et al. |
| 6,842,459 B1 | 1/2005 | Binder |
| 6,847,718 B1 | 1/2005 | Hiraoka |
| 6,854,895 B2 | 2/2005 | Coffey et al. |
| 6,856,799 B1 | 2/2005 | Ritter |
| 6,862,353 B2 | 3/2005 | Rabenko et al. |
| 6,864,798 B2 | 3/2005 | Janik |
| 6,865,193 B2 | 3/2005 | Terk |
| 6,868,072 B1 | 3/2005 | Lin et al. |
| 6,868,265 B2 | 3/2005 | Zodnik |
| 6,880,020 B1 | 4/2005 | Rubinstein et al. |
| 6,889,095 B1 | 5/2005 | Eidson et al. |
| 6,904,134 B2 | 6/2005 | Jeon et al. |
| 6,909,725 B1 | 6/2005 | Chow |
| 6,917,681 B2 | 7/2005 | Robinson et al. |
| 6,922,407 B2 | 7/2005 | Wu |
| 6,925,089 B2 | 8/2005 | Chow et al. |
| 6,934,754 B2 | 8/2005 | West et al. |
| 6,937,056 B2 | 8/2005 | Binder |
| 6,941,364 B2 | 9/2005 | Kim et al. |
| 6,943,683 B2 | 9/2005 | Perret |
| 6,947,736 B2 | 9/2005 | Shaver et al. |
| 6,961,303 B1 | 11/2005 | Binder |
| 6,963,559 B2 | 11/2005 | Elo |
| 6,967,952 B1 | 11/2005 | Akers et al. |
| 6,973,394 B2 | 12/2005 | Jaeger et al. |
| 6,989,733 B2 | 1/2006 | Simonsen et al. |
| 6,996,213 B1 | 2/2006 | De Jong |
| 6,996,729 B2 | 2/2006 | Volkening et al. |
| 6,998,964 B2 | 2/2006 | Lomax, Jr. et al. |
| 7,003,102 B2 | 2/2006 | Kiko |
| 7,009,946 B1 | 3/2006 | Kardach |
| 7,016,377 B1 | 3/2006 | Chun et al. |
| 7,053,501 B1 | 5/2006 | Barrass |
| 7,054,303 B2 | 5/2006 | Miyazaki et al. |
| 7,079,647 B2 | 7/2006 | Tomobe |
| 7,095,848 B1 | 8/2006 | Fischer et al. |
| 7,095,849 B2 | 8/2006 | Smith et al. |
| 7,099,368 B2 | 8/2006 | Santhoff et al. |
| 7,099,707 B2 | 8/2006 | Amin et al. |
| 7,106,721 B1 | 9/2006 | Binder |
| 7,113,574 B1 | 9/2006 | Haas et al. |
| 7,142,560 B2 | 11/2006 | Mansfield |
| 7,142,563 B1 | 11/2006 | Lin |
| 7,149,474 B1 | 12/2006 | Mikhak |
| 7,154,996 B2 | 12/2006 | Strauss |
| 7,292,600 B2 * | 11/2007 | Binder .................. 370/463 |
| 7,653,033 B2 | 1/2010 | Beach et al. |
| 7,769,030 B2 | 8/2010 | Binder |
| 7,830,858 B2 | 11/2010 | Binder |
| 7,852,874 B2 | 12/2010 | Binder |
| 2001/0039660 A1 | 11/2001 | Vasilevsky et al. |
| 2002/0006137 A1 | 1/2002 | Rabenko et al. |
| 2002/0015489 A1 | 2/2002 | Ben-David |
| 2002/0021465 A1 | 2/2002 | Moore et al. |
| 2002/0031114 A1 | 3/2002 | Terry et al. |
| 2002/0039388 A1 | 4/2002 | Smart et al. |
| 2002/0057581 A1 | 5/2002 | Nadav |
| 2002/0059634 A1 | 5/2002 | Terry et al. |
| 2002/0064039 A1 | 5/2002 | Clodfelter |
| 2002/0069417 A1 | 6/2002 | Kliger et al. |
| 2002/0076038 A1 | 6/2002 | Barrese et al. |
| 2002/0097821 A1 | 7/2002 | Hebron et al. |
| 2002/0104009 A1 | 8/2002 | Zodnik |
| 2002/0110236 A1 | 8/2002 | Karnad |
| 2002/0116720 A1 | 8/2002 | Terry et al. |
| 2002/0118676 A1 | 8/2002 | Tonnby et al. |
| 2002/0128009 A1 | 9/2002 | Boch et al. |
| 2002/0144159 A1 | 10/2002 | Wu et al. |
| 2002/0150155 A1 | 10/2002 | Florentin et al. |
| 2002/0159402 A1 | 10/2002 | Binder |
| 2002/0166124 A1 | 11/2002 | Gurantz et al. |
| 2002/0166125 A1 | 11/2002 | Fulmer |
| 2002/0174423 A1 | 11/2002 | Fifield et al. |
| 2002/0176567 A1 | 11/2002 | Chen et al. |
| 2002/0180592 A1 | 12/2002 | Gromov |
| 2002/0194383 A1 | 12/2002 | Cohen et al. |
| 2002/0194605 A1 | 12/2002 | Cohen et al. |
| 2002/0198952 A1 | 12/2002 | Bell |
| 2003/0016794 A1 | 1/2003 | Brothers |
| 2003/0061522 A1 | 3/2003 | Ke et al. |
| 2003/0062990 A1 | 4/2003 | Schaeffer et al. |
| 2003/0066082 A1 | 4/2003 | Kliger et al. |
| 2003/0099228 A1 | 5/2003 | Alcock |
| 2003/0107269 A1 | 6/2003 | Jetzt |
| 2003/0112965 A1 | 6/2003 | McNamara et al. |
| 2003/0133476 A1 | 7/2003 | Stone et al. |
| 2003/0146765 A1 | 8/2003 | Darshan et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0206623 A1 | 11/2003 | Deichstetter et al. |
| 2003/0207696 A1 | 11/2003 | Willenegger et al. |
| 2003/0207697 A1 | 11/2003 | Shpak |
| 2004/0013098 A1 | 1/2004 | Tseng et al. |
| 2004/0073597 A1 | 4/2004 | Caveney |
| 2004/0083262 A1 | 4/2004 | Trantow |
| 2004/0090984 A1 | 5/2004 | Saint-Hilaire et al. |
| 2004/0107299 A1 | 6/2004 | Lee et al. |
| 2004/0107445 A1 | 6/2004 | Amit |
| 2004/0121648 A1 | 6/2004 | Voros |
| 2004/0136384 A1 | 7/2004 | Cho |
| 2004/0147232 A1 | 7/2004 | Zodnik |
| 2004/0198236 A1 | 10/2004 | Paine et al. |
| 2004/0204040 A1 | 10/2004 | Heijnen |

| | | | |
|---|---|---|---|
| 2004/0268160 | A1 | 12/2004 | Atkinson et al. |
| 2005/0038875 | A1 | 2/2005 | Park |
| 2005/0047379 | A1 | 3/2005 | Boyden et al. |
| 2005/0053087 | A1 | 3/2005 | Pulyk |
| 2005/0073968 | A1 | 4/2005 | Perlman |
| 2005/0076148 | A1 | 4/2005 | Chan |
| 2005/0086389 | A1 | 4/2005 | Chang |
| 2005/0086694 | A1 | 4/2005 | Hicks et al. |
| 2005/0125083 | A1 | 6/2005 | Kiko |
| 2005/0136972 | A1 | 6/2005 | Smith et al. |
| 2005/0152306 | A1 | 7/2005 | Bonnassieux et al. |
| 2005/0152337 | A1 | 7/2005 | Wurtzel et al. |
| 2005/0177640 | A1 | 8/2005 | Rubinstein et al. |
| 2006/0153169 | A1 | 7/2006 | Koifman et al. |
| 2006/0193310 | A1 | 8/2006 | Landry et al. |
| 2006/0193313 | A1 | 8/2006 | Landry et al. |
| 2006/0215680 | A1 | 9/2006 | Camagna |
| 2006/0238250 | A1 | 10/2006 | Camagna et al. |
| 2006/0251094 | A1 | 11/2006 | Van Vleck et al. |
| 2006/0251159 | A1 | 11/2006 | Huotari et al. |
| 2006/0251179 | A1 | 11/2006 | Ghoshal |
| 2006/0280197 | A1 | 12/2006 | Stone |
| 2006/0291493 | A1 | 12/2006 | Schley-May et al. |

FOREIGN PATENT DOCUMENTS

| | | |
|---|---|---|
| EP | 0241152 | 10/1987 |
| EP | 1343253 | 9/2003 |
| GB | 2368979 | 5/2002 |
| JP | 56-87192 | 7/1981 |
| JP | 57-204655 | 12/1982 |
| JP | 58-206257 | 12/1983 |
| JP | 7-336379 | 12/1995 |
| JP | 09-84146 | 3/1997 |
| WO | 9623377 A1 | 8/1996 |
| WO | WO 96/23377 | 8/1996 |
| WO | WO 97/50193 | 12/1997 |
| WO | WO 98/02985 | 1/1998 |
| WO | WO 01/43238 | 6/2001 |
| WO | WO 02/091652 | 11/2002 |
| WO | WO 02/102019 | 12/2002 |

OTHER PUBLICATIONS

"Video Transmission System—Send Video Over Ordinary Wire—No Coax Required", Javelin Brochure, 2 pages.

TeleVideo Brochure, 2 pages.

O. Agazzi, et al., "Large Scale Integration of Hybrid-Method Digital Subscriber Loops,"IEEE Transactions on Communications, vol. COM-30, No. 9, Sep. 1982, pp. 2095-2108.

J. Alves, "Data Over Voice—A Low Cost LAN Alternative", Communications Show and Conference, MECOM 87, January, pp. 13-15.

A. Bienz, "1+1=1—Order Das Telefonnetz Als Datennetz", Sysdata, vol. 16, Aug. 28, 1985, pp. 41-42.

A. Brosio, et al., "A Comparison of Digital Subscriber Line Transmission Systems Employing Different Line Codes", IEEE Transactions on Communications, vol. COM-29, No. 11, Nov. 1981, pp. 1581-1588.

T.P. Byrne, et al., "Positioning the Subscriber Loop Network for Digital Services", IEEE Transactions on Communications, vol. COM-30, No. 9, Sep. 1982, pp. 2006-2011.

R.G. Cornell, et al., "Progress Towards Digital Subscriber Line Services and Signaling", IEEE Transactions on Communications, vol. COM-29, No. 11, Nov. 1981, pp. 1589-1594.

S. Davis, "Integrating Voice and Data: A Marriage of Convenience", Today's Office, vol. 24, No. 9, Feb. 1990, pp. 28-30.

M. Devault, et al., "Resaux Domestiques et Terminaux Audiovisuels Numeriques", L'Echo Des Recherches, No. 126, 1986, pp. 37-46.

H. Fuchs, et al., "Providing Full Duplex Transmission Over Two-Wire Subscriber Loops", Telephony, vol. 208, No. 11, Mar. 18, 1985, pp. 76, 77, 78 and 84.

H. Fukagawa, et al., "Bus Wiring System for Residences", Matsushita Electric Works Technical Report, No. 36, Feb. 1988, pp. 31-35.

D. Glick, et al., "Providing Telco Customers Continuous Data Services", Telephony, vol. 205, No. 22, Nov. 1983, pp. 46, 50, 51, 54.

J.B. Hughes, et al., "A Receiver IC for a 1+1 Digital Subscriber Loop", IEEE Journal of Solid State Circuitry, vol. S.C. 20, No. 3, Jun. 1985 pp. 671-678.

R. Jelski, "Subscriber Subcarrier System—A New Life," Communications International, vol. 4, No. 5, May 1977, pp. 29-30.

A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.

T. Masuda, et al., "2-Wire Video Intercom System with Telephone", National Technical Report, vol. 37, No. 6, Dec. 1991, pp. 74-80.

T. Matthews, "Telecomm System is Nerve Center", Infosystems, vol. 31, No. 5, May 1984, pp. 68-69.

J. K. Merrow, "A New Approach to Integrating Local Area Data and Voice Transmission," Telephony, vol. 250, No. 17, Oct. 1983, 2 pages.

H. Morgan, "Two-Wire Full-Duplex Modem Simplifies Voice and Data Networking", Mini-Micro Systems, vol. 17, No. 3, Mar. 1984, 4 pages.

R. Murakoshi, "Home Automation", Journal of the Society of Instrument and Control Engineers, vol. 23, No. 11, Nov. 1984, pp. 955-958.

R.D. Nash, et al., "Simultaneous Transmission of Speech and Data Over An Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.

H. Ogiwara, et al., Design Philosophy and Hardware Implementation for Digital Subscriber Loops, IEEE Transactions on Communications, vol. COM-30, No. 9, Sep. 1982, pp. 2057-2065.

J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.

R.A. Tatum, "Project Victoria—the 7-in-1 Solution", Telephone Engineer and Management, vol. 90, No. 1, Jan. 1, 1986, pp. 47 and 50.

A. Teshima, et al., "Still Video Telecommunication Over the Analog Telephone Network", Journal of the Institute of Television Engineers of Japan, vol. 42, No. 11, Nov. 1988, pp. 1162-1167.

S.R. Treves, et al., "Text, Image and Data Integration in a Distributed Control Digital Voice Switching System", International Switching Symposium—ISS '81 CIC, Sep. 21-25, 1981, Montreal, Quebec, Canada, pp. 1-7.

T. Tsuda, et al., "Experimental In-House Multiservice Communication System", Fujitsu Scientific and Technical Journal, vol. 16, No. 3, Sep. 1980, pp. 29-45.

K. Urui, "Integrated Voice/Data Digital EPBX", Toshiba Review, No. 150, Winter 1984, pp. 30-33.

A.F. Van Den Berg, et al., "Principles van de Modem: Technieken en Specificaties", Elektronica, vol. 32, No. 5, Mar. 9, 1984, pp. 11, 13, 15, 17, 19 and 21.

M.G. Vry, et al., "Digital 1+1 Systems for Local Network Enhancement", Conference on Communications Equipment and Systems, Apr. 20-22, 1982, Birmingham, United Kingdom, pp. 61-64.

M.G. Vry, et al., "The Design of a 1+1 System for Digital Signal Transmission to the Subscriber", NTG-Bachberichte, vol. 73, 1980, pp. 36-40.

J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.

K. Yamamoto, "A Home Terminal System Using the Home Area Information Network", IEEE Transactions on Consumer Electronics, vol. CE-30, No. 4, Nov. 1984, pp. 608-616.

"Centrex LAN Can Provide Advanced Network Capabilities Over the Existing Telephone Wires", Communications News, vol. 25, No. 6, Jun. 1988, p. 27.

"Data Over Voice is Solution for Corporate Network", Telephone Engineer and Management, vol. 91, No. 9, May 1, 1987, pp. 67-69.

"Data Carrier System Allows Simultaneous Voice/Data Transmission for PABX Telephone Systems", Computer Design, vol. 21, No. 5, May 1982, pp. 68 and 70.

"Computerized Telephone System Integrates Voice and Data Switching", Computer Design, vol. 20, No. 4, Apr. 1981, 6 pages.

"At&T's Systemax Premises Distribution System Solves Networking Problems", Fiber Optics Magazine, vol. 12, No. 4, Jul.-Aug. 1990, pp. 14-16.

M.M. Anderson, "Video Services on Copper", Conference: ICC 91, International Conference on Communications Conference Record, Jun. 2-26, 1991, Denver, CO, pp. 302-306.

M. Bastian, "Voice-Data Integration: An Architecture Perspective," IEEE Communications Magazine, vol. 24, No. 7, Jul. 1986, pp. 8-12.

M. Boubekker, "Bandwidth Reduction for the Transmission of Sign Language Over Telephone Lines", Proceedings of the SPIE-The International Society for Optical Engineering, vol. 1001, Part. 1, 1988, pp. 223-230.

S. Bramblett, "Connect Terminals to Your CPU Over PBX Telephone Lines", EDN, vol. 31, No. 5, Mar. 6, 1986, pp. 239-243, 245, 246 and 248.

G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.

C. Dougligeris, et al., "Communications and Control for a Home Automation System", Conference: IEEE Proceedings of the Southeastcon '91, vol. 1, pp. 171-175.

D.G.J. Fanshawe, "Architures for Home Systems", Conference: IEEE Colloquium on Home Systems—Information, Entertainment and Control, Oct. 1, 1990, London, United Kingdom, pp. 3/1-3/3.

N.C. Hightower, "Integrated Voice, Data and Video in the Local Loop", IEEE 1986, pp. 915-919.

M. Inoue, et al., "A Home Automation System", IEEE Transactions on Consumer Electronics, vol. CE-31, No. 3, Aug. 1985, pp. 516-527.

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page.

S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D5.1.5.

G. Neumann, Flexible and Cost-Minimising System Concept (Ericsson Digital PABX MD 110), Net Nechrichten Elektronik-Telematik, Special Issue, Mar. 1988, pp. 11, 12, 14 and 15.

H. Nishi, et al., "Control of a Star/Bus Key Telephone System", NTT R & D, vol. 39, No. 8, 1990, pp. 122, 1222, 1224-1228.

A. Pietrasik, et al., "Subscriber Carrier Telephony System 1+1", Wiadomosci Telekomunikacyjne, vol. 17, No. 7-8, Jul.-Aug. 1977, pp. 183-198.

V. Punj, "Broadband Applications and Services of Public Switched Networks", IEEE Transactions on Consumer Electronics, vol. 35, No. 2, May 1989, pp. 106-112.

T. Sodeyama, et al., "Intelligent House", Journal of the Institute of Electronics, Information and Communication Engineers, vol. 72, No. 9, Sep. 1989, pp. 1024-1026.

H. Tanaka, et al., "Telecontrol System VJ-501", National Technical Report, vol. 32, No. 6, Dec. 1986, pp. 809-817.

C. Valenti, "Study of the Feasibility and Advisability of Digital Subscriber Lines Operating at Rates Substantially in Excess of the Basic Access Rate", T1E1.r Technical Subcommitte (T1E1.4/91-115), pp. 2 and 4.

D. L. Waring, "The Asymmetrical Digital Subscriber Line (ADSL): A New Transport Technology for Delivering Wideband Capabilities to the Residence", Globecom '91, IEEE, pp. 1979-1986.

K. Yamamoto, et al., "New Home Telephone System Using Japanese Home Bus System Standard," IEEE Transactions on Consumer Electronics, vol. 35, No. 3, Aug. 1989, pp. 687-697.

T. Yamazakli, et al., "Home Appliance Technologies," NEC Research and Development, No. 96, Mar. 1990, pp. 292-299.

Funkschau, "CEBus: US Households are Being Networked", No. 9, Apr. 1989, pp. 45-47.

"Shared Services (Data/Voice Network)", Communications News, vol. 25, No. 11, Nov. 1988, pp. 46-47.

Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).

A. Artom, et al., "The Possible Use Of Customer Loop For New Services During The Transition From Analogue To Digital", Revue F.I.T.C.E., Mar.-Apr. 1981, vol. 20, No. 2, pp. 50-56.

A. Artom, et al., "Medium-Term Prospects for New Servies to the Telephone Customers," Conference Record, Jun. 14-18, 1981, Int'l Conf. On Communications, Denver, CO., pp. 14.4.1-14.4-6.

Hoe-Young Noh, "Home Automation", Korea Information Science Society Review, Apr. 1989, vol. 7 No. 2, pp. 40-44, Republic of Korea. (Translation Provided).

M. Coronaro, et al., "Integrated Office Communication System," Electrical Communication, 1986, pp. 17-22, vol. 60, No. 1, Face Research Center, Pomezia, Italy.

Chow, et al., "A Multi-drop In-House ADSL Distribution Network"; IEEE 1994, pp. 456-460.

English Language Abstract for Japanese Patent 1-27358 (64-27358) Jan. 30, 1989.

Bellcore: Request for Information: Asymmetrical Digital Subscriber Line (ADSL) Systems That Support Simplex High-Bit-Rate Access and POTS in the Copper Loop Plant; Jun. 1991.

Twisted Pair Physical Layer and Medium Specification; Revision: IS-60 8-18-95 (49 pages).

Introduction to the CEBus Standard; Revision 2-5-95 Draft Copy (19 pages).

Compaq to Ride The CEBus; by Mark Nachman, EBN Jan. 22, 1996 (1 page).

CEBus Router Testing; IEEE Transactions on Consumer Electronics Nov. 1991, vol. 37 No. 4 (8 pages).

Broadband Network Technology—An Overview for the Data and Telecommunications Industries; by Edward Cooper, Copyright 1984, pp. 51-52 (4 pages).

Technical Report TR-001 ADSL Forum System Reference Model; May 1996 (6 pages).

Ascend DSLPipe-S Features; Posted May 12, 1997 (2 pages).

Ascend DSLPipe-S Specifications; (2 pages).

Broadband Digital Subscriber Line—A Full Service Network for the Copper Plant; Telephony / Jun. 12, 1995, vol. 228 No. 24 (8 pages).

Commtek Intros Video over UTP; Communications Week, Feb. 10, 1992 (3 pages).

Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages (s), None. cited by other.

"Home Phoneline Networking Alliance", Interface Specification for HomePNA 2.0 10M8 Technology Link Layer Protocol, (Dec. 1, 1999), pp. 1-39.

"Home Phoneline Networking Alliance", Interface Specification for HomePNA 2.0 10M8 Technology, (Dec. 1, 1999), pp. 1-77.

Paola Bisaglia, et al., Receiver Architectures for HomePNA 2.0, Hewlett Packard Laboratories, Bristol, U.K., Oct. 17, 2001.

Loh, L.; Ozturk, Y.; Quality of Support and Priority Management in HomePNA 2.0 Link Layer.quadrature..quadrature. Computers and Communication; Jun. 30-Jul. 3, 2003. (ISCC 2003). Proceedings. Eighth IEEE International Symposium; pp. 861-866 vol. 2.

Phoneline / HPNA / HomePNA Networks, http://www.homenethelp.com/web/howto/HomeNet-HPNA.asp (visited Jul. 29, 2003) (3 pages).

Anonymous, HomePNA Specification 1.0 Field Tests Status, Mar. 1999, Home Phoneline Networking Alliance, Inc, pp. 1-6.

21145 Phoneline/Ethernet LAN Controller, Intel Corporation .COPYRGT. 1999, http://developer.intel.com/design/network/21145.htm.

Simple, High-Speed Ethernet Technology For The Home, White Paper, Home Phoneline Networking Alliance, Jun. 1998, pp. 1-11.

Information on Home PhoneLine Networking Alliance (Home PNA), dated Jun. 1998 and before.

Lon Works LPI-10 Link Power Interface Module User's Guide; Echelon Corporation, 1995 (37 pages).

Lon Works LPT-10 Link Power Transceiver User's Guide Version 2.1; Echelon Corporation, 1995 (60 pages).

Lon Works Router User's Guide Revision 3; Echelon Corporation, 1995 (68 pages).
Using the Lon Works PLT-22 Power Line Transceiver in European Utility Application, Version 1; Echelon Corporation, 1996-1999 (118 pages).
PL3120/PL3150 Power Line Smart Transceiver Data Book, Version 2; Echelon Corporation, 1996-2005 (255 pages).
PL DSK 2.1 Power Line Smart Transceiver Development Support Kit User's Guide; Echelon Corporation, 2005-2006 (18 pages).
Introduction to Pyxos FT Platform; Echelon Corporation, 2007 (34 pages).
LTM-10A User's Guide, Revision 4; Echelon Corporation, 1995-2001 (46 pages).
Lon Works Twisted Pair Control Module, User's Guide Version 2; Echelon Corporation, 1992-1996 (50 pages).
AN1000EVK Evaluation Unit Manual, Draft 1.0; Adaptive Networks Inc., Document No. 04-3170-01-B Aug. 1996 (31 pages).
AN1000 Powerline Network Communications Chip Set, Adaptive Networks Inc., 1995 (56 pages).
From the Ether—Bob Metcalfe, 'Cheap, reliable 'net connections may be as close as an electrical socket'; by Bob Metcalfe Info World Feb. 10, 1997 vol. 19 Issue 6 (4 pages).
Lon Works Custom Node Development, Lon Works Engineering Bulletin; Echelon Corporation, Jan. 1995 (16 pages).
Building a Lon Talk-to-PLC Gateway, Lon Works Engineering Bulletin; Echelon Corporation, May 1994 (62 pages).
Lon Works 78kbps Self-Healing Ring Architecture, Lon Works Marketing Bulletin; Echelon Corporation, Aug. 1993 (6 pages).
Centralized Commercial Building Applications with the Lon Works PLT-21 Power Line Transceiver, Lon Works Engineering Bulletin; Echelon Corporation, Apr. 1997 (22 pages).
Lon Works for Audio Computer Control Network Applications; Echelon Corporation, Jan. 1995 (30 pages).
Demand Side Management with Lon Works Power Line Transceivers, Lon Works Engineering Bulletin; Echelon Corporation, Dec. 1996 (36 pages).
'Switching Hubs—Switching to the Fast Track', by Gary Gunnerson, PC Magazine, Oct. 11, 1994 (24 pages).
VISPLAN-10 Infrared Wireless LAN system; JVC May 1996 (10 pages).
'JVC Introduces Ethernet Compatible Wireless LAN System'; Business Wire Sep. 26, 1995 (1 page).
Ethernet Wireless LAN Systems; BYTE Feb. 1996 (3 pages).
'JVC Introduces First Ethernet Compatible Wireless LAN System'; Business Wire Nov. 8, 1995 (1 page).
Intelogis to Present on Stage at Internet Showcase 1998; PR Newswire Jan. 28, 1998 (1 page).
PassPort PC Plug In Quick Setup Guide; Intelogis P/N 30030202, date unknown (8 pages).
High Speed Networking with LAN Switches, by Gilbert Held; Copyright 1997 by John Wiley & Sons, Inc. (290 pages).
'The Complete Modem Reference', Third Edition, By Gilbert Held, 1997, ISBN: 0-471-15457-1 (488 pages).
'High-Speed Networking with LAN Switches', By Gilbert Held, 1997, ISBN: 0-471-18444-6 (281 pages).
'Interconnections Bridges and Routers', By Radia Perlman, 1992, ISBN: 0-201-56332-0 (393 pages).
'Macworld Networking Bible', Second Edition pp. 1-331, By Dave Kosiur and Joel M. Snyder, 1994, ISBN: 1-56884-194-9 (354 pages).
'Macworld Networking Bible', Second Edition pp. 332-688, By Dave Kosiur and Joel M. Snyder, 1994, ISBN: 1-56884-194-9 (363 pages).
'High-Speed Cable Modems', pp. 1-246 By Albert A. Azzam, 1997, ISBN: 0-07-006417-2 (276 pages).
'High-Speed Cable Modems', pp. 247-570 By Albert A. Azzam, 1997, ISBN: 0-07-006417-2 (321 pages).
IBM LAN Bridge and Switch Summary -undated (108 pages).
Hart Field Communication Protocol—An introduction for users and manufacturers' published by the HART Communication Foundation, Austin, Texas, Oct. 1995 (12 pages).
Continuation of IBM LAN Bridge and Switch Summary -undated (68 pages).
Motorola announces key new features to CyberSURFR Cable Modem System- undated (3 pages).
SuperStack II Desktop Switch; 3Com Sep. 1996 (2 pages).
Cisco's 2600 Series Routers, "Quick Start Guide: Cisco 2610 Router, Cabling and Setup," published in 1998.
NBX Corporation's NBX 100,"Network Based Exchange: The Complete Communications Solution," published in 1997.
Kevin Fogarty, "ZAP! NetWare users get really wired—over electric power lines," Network World , Jul. 3, 1995.
*Serconet, Ltd.*, v. *Netgear, Inc.* Case No. CV-06-04646 PJH, Defendant's Invalidity Contentions, Jan. 29, 2007.
*Serconet, Ltd.*, v. *Netgear, Inc.* Case No. CV-06-04646 PJH, Order Construing Claims, Jul. 30, 2007.
*Serconet, Ltd.*, v. *Netgear, Inc.* Case No. CV-06-04646 PJH, Claim Comparison Chart for USP 6,480,510, Jan. 29, 2007.
*Serconet, Ltd.*, v. *Netgear, Inc.* Case No. CV-06-04646 PJH, Claim Comparison Chart for USP 7,016,368, Jan. 29, 2007.
*Serconet, Ltd.*, v. *Netgear, Inc.* Case No. CV-06-04646 PJH, Claim Comparison Chart for USP 7,035,280, Jan. 29, 2007.
NetSpeed, "SpeedRunner 202 Customer Premise ATM ADSL Router" published 1997.
Compaq Deskpro 4000S Series of Personal Computers, published in Jul. 1997.
IS-60.04; Node Communications Protocol Part 6: Application Layer Specification; Revision Apr. 18, 1996 (129 pages).
Claim Chart presented in request for reexamination of U.S. Patent No. 6,480,510 request filed Jun. 10, 2009.
Claim Chart presented in request for reexamination of U.S. Patent No. 5,841,360 request filed May 26, 2009.
Motorola CableComm CyberSURFR Cable Modem Specifications; Apr. 1998; 4 page.
Line Carrier Modems—1. Build a Pair of Line-Carrier Modems (Part 1); Radio Electronics; Jul. 1988; pp. 87-91 by Keith Nichols; 7 pages.
Line Carrier Modems—2. Build a Pair of Line-Carrier Modems (Part 2); Radio Electronics; Aug. 1988; pp. 88-96 by Keith Nichols; 5 pages.
Technical Report TR-001 ADSL Forum System Reference Model; May 1996; 6 pages.
Mitel, ISO-CMOS ST-BUS Family, MT8971B/72B; Digital Subscriber Interface Circuit/Digital Network Interface Circuit; Issue 7, pp. 1-21, May 1995.
Superseded, Data-Over-Cable Interface Specifications/Radio Frequency Interface Specification, SP-RFII-970326, pp. 1-189, copyright 1997.
SX-200 Digital PABX/Circuit Card Descriptions 9109-094-125-NA, Issue 4, Revision 1, pp. 1-48, Nov. 1990.
SX-200 Digital PABX/Features Description 9109-094-105-NA, Issue 4, Revision 1, pp. 1-350, Nov. 1990.
SX-200 Digital PABX/General Description 9109-094-100-NA, Issue 4, Revision 1, pp. 1-46, Nov. 1990.
SX-200 Digital and SX-200 Light PABX, General Information Guide Lightware 15, 9109-952-006-NA, Issue 1, Revision 0, pp. 1-222, Mar. 1992.
*Cisco Systems, Inc.* v. *Mosaid Technology Inc.*, redacted, public version Complaint filed in the United States District Court for the District of Delaware, Aug. 16, 2010 (full version of the Complaint having been filed under seal and thus unavailable to the public).
"TeleConcepts . . . Introduces the Just Plug It In Intercom System, "TeleConcepts Brochure, Newington, CT, 2 pages, published before Jul. 3, 1995.
TeleVideo Brochure, 2 pages, published before Jul. 3, 1995.
J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page, Mar. 13, 1989.
C. Valenti, "Study of the Feasibility and Advisability of Digital Subscriber Lines Operating at Rates Substantially in Excess of the Basic Access Rate", T1E1 .r Technical Subcommittee (T1E1.4/91-115), pp. 2 and 4, Aug. 26, 1991.
Ascend DSLPipe-S Specifications, 2 pages, 1997.
Hofmann, J., "Cable, Television, and the Consumer Electronic Bus", pp. 165-173, Symposium Record, 15th International TV Symposium, Jun. 11, 1987, Montreux, Switzerland.

Hoffman, J.; "Cable, Television, and the Consumer Electronic Bus"; Panasonic Technologies. Inc., pp. 165-173, Jun. 11, 1987.
IS-60.04; Node Communications Protocol Part 6: Application Layer Specification; Revision Apr. 18, 1996 (129 pages), Apr. 18, 1996.
Heite C et al: "Powernet—Das Neue Eib-Medium", Elektrotechnik und Informationstechnik, Springer Verlag, Wein, AT, vol. 114, No. 5, 1997, pp. 254-257.
"The DSL Sourcebook", Paradyne Corporation, Copyright 2000, DSL-BOOK-3.0/0900, 98 pages.
Olshansky, "A Full Service Network for the Copper Plant", Telephony, 1985, pp. 52-60.
"TeleConcepts . . . Introduces the Just Plug It In Intercom System, "TeleConcepts Brochure, Newington, CT, 2 pages, Jul. 3, 1995.
Instant Network Rules on Phone Lines, Electronic Design, 1987.
O. Agazzi, et al., "Large Scale Integration of Hybrid-Method Digital Subscriber Loops, "IEEE Transactions on Communications, vol. COM-30, No. 9, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1564.
J. Alves, "Data Over Voice—A Low Cost LAN Alternative", Communcatons Show and Conerence, MECOM 87, Jan., pp. 13-15.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
*USRobotics Courier V. Everything External Modem*—Getting Started Guide (1996).
ITU-T Recommendation V.34 (Oct. 1996).
48-Volt DC Power Supply Connection Guide; 3Com Published Mar. 2000 (12 pages).
SuperStack II PS Hub User Guide; 3Com Published Jul. 1997 (188 pages).
SuperStack II Entry Hub User Guide; 3Com Published Nov. 1996 (8 pages).
SuperStack II Baseline Switch User Guide; 3Com Published Mar. 1998 (8 pages).
SuperStack II Baseline 10/100 switch; 3Com Published Apr. 1998 (8 pages).
SuperStack II Desktop Switch User Guide; 3Com Published Jun. 1997 (148 pages).
SuperStack II Switch 610 User Guide; 3Com Published May 1999 (54 pages).
line carrier modems—1: Build a Pair of Line-Carrier Modems (Part 1); Radio Electronics, Jul. 1988, pp. 87-91 by Keith Nichols (7 pages).
line carrier modems—2: Build a Pair of Line-Carrier Modems (Part 2); Radio Electronics, Aug. 1988, pp. 88-96 by Keith Nichols (5 pages).
Universal Serial Bus Specification Revision 1.0; Jan. 15, 1996 (268 pages).
3ComImpact IQ External ISDN Modem User product brochure; Published Jun., 1996 (4 pages).
3ComImpact IQ External ISDN Modem User Guide; Published Jul. 1997 (157 pages).
Cisco Catalyst 5000 Series Configuration Worksheet, 1996 (11 pages).
Cisco Catalyst 5000 Product Announcement, Published 1996 (22 pages).
Cisco Catalyst 5000 ATM Dual PHY LAN Emulation Module; Posted Sep. 24, 1996 (4 pages).
Cisco Catalyst 5000 Group Switching Ethernet Modules; Posted May 6, 1996 (5 pages).
The Mac Reborn; Macworld Sep. 1996, pg. 104-115 (16 pages).
The Mac reborn; Macworld vol. 13, Issue 9, Sep. 1996 (9 pages).
Cisco Catalyst 5000; Industry's First Modular, Multilayer-Capable switching System for the Wiring Closet; Posted May 16, 1996 (22 pages).
Catalyst 5000 switching System; Cisco (4 pages).
Cisco Catalyst 5002 Switching System; (4 pages).
Canned Heat; Data Communications Feb. 1996 (10 pages).
Catalyst 5000 Series; (12 pages).
Fast Ethernet 100-Mbps Solutions; Posted Mar. 12, 1996 (10 pages).
Forget the Forklift; Data Communications Sep. 1996 (11 pages).
LAN Emulation; Posted Nov. 15, 1995 (16 pages).
IBM LAN Bridge and Switch Summary, IBM, published Jan. 1996 (70 pages).
Continuation of IBM LAN Bridge and Switch Summary, IBM, published Jan. 1996 (70 pages).
Edward Cooper, Broadband Network Technology-An overview for the data and communications industries, Sytek Systems, Mountain View, CA, 1984 (4 pages).
Grayson Evans, The Cebus Standard User'S Guide May, 1996 (317 pages).
Technical Report TR-001 ADSL Forum System Reference Model May, 1996 (6 pages).
Cisco Catalyst 5000 Group Switching Ethernet Modules Data Sheets; 1996 (2 pages).
Cisco Catalyst 5000 Switching System Data Sheets; 1996 (2 pages).
Cisco Catalyst 5000 ATM LAN Emulation Module Data Sheets; 1995 (2 pages).
Cisco Catalyst 5000 Family Fast EtherChannel Switching Modules Data Sheets; 1999 (3 pages).
Motorola CableComm CyberSURFR Cable Modem Specifications; Apr. 1998 (4 pages).
3Com Product details 3COM NBX 2101PE Basic Phone discontinued undated (3 pages).
Catalyst 5000 Series; undated (12 pages).
IEEE Standard for a High Performance serial Bus; IEEE Std 1394-1995 Published 1996 (392 pages).
DSLPipe Reference Guide; by Ascend Communications, Jun. 2, 1997 (162 pages).
DSLPipe User's Guide; by Ascend Communications, Jun. 3, 1997 (245 pages).
Ascend DSLPipe-S Features and specifications; Posted May 12, 1997 (4 pages).
CiscoPro EtherSwitch CPW2115; Dec. 95 (4 pages).
IBM LAN Bridge and Switch Summary-undated (108 pages).
HART Field Communication Protocol-An introduction for users and manufacturers' published by the HART Communication Foundation, Austin, Texas, Oct. 1995 (12 pages).
Continuation of IBM LAN Bridge and Switch Summary-undated (68 pages).
Motorola announces key new features to CyberSURFR Cable Modem System-undated (3 pages).
SuperStack II Desktop Switch; 3Com Sep. 96 (2 pages).
U.S. ITC Complaint in the matter of Certain Equipment for Communications Networks, Including Switches, Routers, Gateways, Bridges, Wireless Access Points, Cable Modems, IP Phones, and Products Containing Same, May 13, 2011.
3Com Product details 3COM NBX 210PE Basic Phone discontinued undated (3 pages), Jan. 18, 2007.
Catalyst 5000 Series; undated (12 pages), 1996.
TeleConcepts . . . Introduces the Just Plug It In Intercom System, TeleConcepts brochure, newington, CT, 2 pages, Jul. 3, 1995.
"Video Transmission System—Send Video Over ordinary Wire—No Coax Required", Javelin Brochure, 2 pages, Jul. 3, 1995.
TeleVideo Brochure, 2 pages, Jul. 3, 1995.
Hoffman, J.; "Cable, Television, and the Consumer Electronic Bus", Panasonic Technologies. Inc., pp. 165-173, Jun. 11, 1987.
Stallings, William, Local Networks (Third Edition), 1990, 1-534.
International Telecommunication Union, "ISDN User-Network Interface Data Link Layer—General Aspects", CCITT, Q.920, Nov. 1988, 20 pages.
International Telecommunication Union, "ISDN User-Network Interface Data Link Layer Specification"CCITT, Q.921, Nov. 1988, 118 pages.
International Telecommunication Union, "ISDN User-Network Interfaces—Reference Configurations", I.411, Mar. 1993, 11 pages.
International Telecommunication Union, "ISDN User-Network Interfaces—Interface Structures and Access Capabilities", I.412, 1988, 7 pages.

International Telecommunication Union, "ISDN User-Network Interfaces—Basic User-Network Interface—Layer 1 Specification", I.430, Mar. 1993, 106 pages.
International Telecommunication Union, "ISDN User-Network Interfaces—Primary Rate User-Network Interface—Layer 1 Specification", I.431, Mar. 1993, 44 pages.
Suranyi, Gabriel G., "The Need for Home Power: It Is Just Around the Corner", Telecommunications Energy Conference, INTELEC, 19th International, Oct. 1997, 80-86.
Fausti, A. et al, "Remote Powered Data Transmission System, Telecommunications Energy Conference", INTELEC'89, Conference Proceedings, Eleventh International, vol. 2, Oct. 1989, 1-5.
"IEEE 802.1D, IEEE International Standard: Information Technology-Telecommunications and Information Exchange Between Systems—Local Area Networks—Media Access Control (MAC) Bridges", 181 pages, Jul. 8, 1993.
Droms, R., "Dynamic Host Configuration Protocol (DCHCP) Request for Comments 1531", Bucknell University, Oct. 1993, 1-40.
Wimer, W., "Clarifications and Extensions for the Bootstrap Protocol, Request for Comments 1542", Carnegie Mellon University, Oct. 1993, 1-23.
Platt, Richard, "Why IsoEthernet Will Change the Voice and Video Worlds", IEEE Communications Magazine, vol. 34, Issue 4, Apr. 1996, 55-59.
Platt, Richard, "New Standard Helps Multimedia Get Off the Ground", IEEE Multimedia, vol. 3, Issue 2, Summer 1996, 78-82.
Ross, Floyd E. et al, "IsoEthernet: An Integrated Services LAN", IEEE Communications, vol. 34, Issue 8, Aug. 1996, 74, 79-84.
Shimizu, Hiroshi et al, "IVDLAN Standardization and Development", IEICE Transactions on Communications, vol. E74-B, No. 9, Sep. 1991, 2696-2702.
Amada, Eiichi et al, "An Integrated PABX/LAN System Architecture", Communications, 1988, ICC '88, Digital Technology—Spanning the Universerse, Conference Record, IEEE International Conference, vol. 3., Jun. 1988, 1533-1538.
"HiGain Remote Unit, Engineering Services Technical Practice Section 150-412-181-01, Revision 01", 42 pages, Mar. 31, 1998.
"Ascend Pipeline 25 ISDN Remote Lan Access, Bandwidth on Demand, Getting Started Guide", 111 pages, Aug. 18, 1995.
"AT and T Practice, SLC 24 and 96 Carrier Systems, Channel Unit Installation, Loop Transmission Systems", Select Code 363-202-402, Issue 2, Jul. 1985, 335 pages.
"AT and T Practice, SLC 96 Subscriber Loop Carrier System, Remote Terminal Pair Gain Systems", Select Code 363-202-401, Issue 1, Feb. 1982, 506 pages.
"AT and T Practice, SLC 96 Carrier System, Maintenance Pair Gain System", Select Code 363-202-500, Issue 1, Aug. 1983, 497 pages.
Cervenka, Dana, "Building Cablephone Systems Piece by Piece", CED: Communications Engineering and Design, 6 pages, Mar. 1, 1996.
"Quick Installation and Reference for the Model RPSU Redundant Power Supply Unit", Bay Networks, Sep. 1995, 1-15.
Eldering, Charles et al, "Engineering Requirements for Hybrid Fiber—Coax Telephony Systems", 1994 National Cable Television Association Show, May 1994, 219-231.
Wakerly, John F. et al, "Attaching RS-232 and LAN Capabilities to an Existing Voice-Only Switching Network", published as early as 1985, pp. 1-11.
Zakowski, Wayne A., "IEEE 802.9 Draft Standard Integrated Services (IS) LAN Interface at the MAC and PHY Layers (IEEE Unapproved Draft)", 1-502, Nov. 8, 1992.
"IEEE P802.9af, Draft Standard for Local and Metropolitan Area Networks—Supplement to Integrated Services (IS) LAN Interface at the Medium Access Control (MAC) and Physical (PHY) Layers", 1997, 1-34.
"Setting up MacIP", cisco.com, May 1995, 1-6.
"IP Addressing on the Workgroup Catalyst 1200 Series", cisco.com, Aug. 1995, 1-2.
Wakerly, John F., A Voice/Data/Packet Switching Architecture, David Systems, Inc., 1985, 6 pages.
Horowitz, Paul et al., Art of Electronics, Second Edition, Cambridge University Press, 1989, pp. 44, 45, 47, 48, 316-319.

Bell, Robert, IEEE P802.9F Draft Standard for Local and Metropolitan Area Networks—Supplement to Integrated Services (IS) LAN Interface at the Medium Access Control (MAC) and Physical (PHY) Layers, Nov. 1996, pp. 1-22.
"David Information Manager Technical Overview", Sep. 1988, pp. 1-74.
David Systems, David Information Manager—Overview, 1986, pp. 1-38.
Wakerly, John, The Simple, Definitive Backplane and Timeslot Explanation; D.A.V.I.D. Systems, Inc., pp. 1-8, Sep. 1, 1984.
Wakerly, John, TNIM Timeslot Allocation; D.A.V.I.D. Systems, Inc., pp. 1-3, Apr. 18, 1983.
Wakerly, John, Clock Synchronization of David Managers, D.A.V.I.D. Systems, Inc., pp. 1-8. Mar. 6, 1985.
Wakerly, John, TSBUS Signal Specifications, Rev. 4; D.A.V.I.D. Systems, Inc., pp. 1-8, May 7, 1985.
Cisco Systems, Inc., Respondents' Notice of Prior Art (Redacted); in the Matter of Certain Equipment for Communications Networks, Including Switches, Routers, Gateways, Bridges, Wireless Access Pointes, Cable Modems, IP Phones and Products Containing Same; ITC Investigation No. 337-TA-778, 86 pages, Aug. 12, 2011.
"Bridging and Routing Features for the Cisco uBR904 Cable Modem, Cisco IOS Release 12.0(3) T", 1-38, Jan. 12, 2012.
"Bridging and Routing Features for the Cisco uBR904 Cable Modem", 1-27, Jan. 12, 2012.
"Troubleshooting Tips for the Cisco uBR904 Cable Modem, Cisco IOS Release 12.0(3)T", 1-62, Jan. 12, 2012.
"Troubleshooting Tips for the Cisco uBR924 Cable Access Router, Cisco IOS Release 12.0(5) T", 1-74, Jan. 12, 2012.
"Troubleshooting Tips for the Cisco uBR9O4 Cable Modem", 1-39, Jan. 12, 2012.
"David Information Manager Feature Reference"; David Systems, 1-44, Jan. 12, 2012.
"Cisco IOS Software Releases 12.0T Configuring the Cisco uBR900 Series Cable Access Routers", 1-103, Jan. 12, 2012.
"Cisco 1-Port Euro/JDOCSIS Cable High-Speed WAN Interface Card, DOCSIS integration for select Cisco devices", 1-2, Jan. 12, 2012.
Horowitz, Paul et al, "Art of Electronics", Second Edition, Cambridge University Press, 1989, pp. 1-205, (Part 1).
Horowitz, Paul et al, "Art of Electronics", Second Edition, Cambridge University Press, 1989, pp. 206-354, (Part 2).
Horowitz, Paul et al, "Art of Electronics", Second Edition, Cambridge University Press, 1989, pp. 355-437, (Part 3).
Horowitz, Paul et al, "Art of Electronics", Second Edition, Cambridge University Press, 1989, pp. 438-738, (Part 4).
Horowitz, Paul et al, "Art of Electronics", Second Edition, Cambridge University Press, 1989, pp. 739-924, (Part 5).
Horowitz, Paul et al, "Art of Electronics", Second Edition, Cambridge University Press, 1989, pp. 925-1125, (Part 6).
Media Access Control (MAC) Parameters, Physical Layer, Medium Attachment Units, and Repeater for 100 Mb/s Operation, Type 100BASE-T (Clauses 21-30); IEEE Standards for Local Metropolitan Area Networks: Supplement to Carrier Sense Multiple Access with Collision Detection (CSMA/CD) Access Method and Physical Layer Specifications; 1995, 200 pages
Cervenka, Dana, Cablephone Not Ringing Yet; CED: Communications Engineering and Design, Mar. 1995, pp. 32, 33, 34, 36, 38, 40 and 42.
United States International Trade Commission, Order No. 21: Construing the Terms of the Asserted Claims of the Patents At Issue (Public Version); In the Matter of Certain Equipment for Communications Networks, Including Switches, Routers, Gateways, Bridges, Wireless Access Points, Cable Modems, IP Phones, and Products Containing Same; ITC Investigation No. 337-TA-778, 148 pages, Feb. 14, 2012.
"Air Connect Access Point User Guide, Version 1.0", 1-90, Jan. 1, 2000.
"David Co-Net Command Reference, Revision A, Doc No. 7915-08", 1-342, Dec. 1, 1988.
"David Information Manager System Description Manual, Revision A", 1-114, Mar. 1, 1987.

"Cisco 1805 DOCSIS 2.0 Cable Router, Quick Start Guide", 1-4, Jan. 1, 2007.

"End-Of-Sale and End-Of-Life Announcement for the Cisco 1841 DOCSIS 2.0 Cable Modem Bundles", 1-2, Dec. 1, 2008.

"DOCSIS-Bridging Configuration, Chapter 2 Cisco uBR905/uBR925 Cable Access Router Software Configuration Guide", 1-10, Jul. 1, 2001.

Ulm, John et al, Data-Over-Cable Interface Specifications/Radio Frequency Interface Specification, SP-RFII01-970326, 1-189, Mar. 26, 1997.

Drudy, Francis, "Considerations and Recommendations on Power Feeding at an 802.9", IEEE 802.9—IVD LAN Interface Working Group, Reference IEEE 802.87*9.618, 1-6, Nov. 5, 1987.

Bell, Robert, "IEEE Standards Project, P802.9F Draft Standard for Local and Metropolitan Area Netoworks—Supplement to Integrated Services (IS) LAN Interface At the Medium Access Control (MAC) and Physical (PHY) Layers", 1-34, Jul. 8, 1997.

Bell, Robert, "IEEE P802.9F Draft Standard for Local and Metropolitan Area Networks—Supplement to Integrated Services (IS) LAN Interface at the Medium Access Control (MAC) and Physical (PHY) Layers", 1-22, Nov. 7, 1996.

"IEEE 802.9, IEEE Standards for Local and Metropolitan Area Networks: Integrated Services (IS) LAN Interface At the Medium Access Control (MAC) and Physical (PHY) Layers, IEEE Standard 802.9", 1-437, Sep. 22, 1994.

"IEEE 802.9A, IEEE Standards for Local and Metropolitan Area Networks: Supplement to Integrated Services (IS) LAN Interface at the Medium Access Control (MAC) and Physical (PHY) Layers: Specification of ISLAN16-T", 1-344, Oct. 16, 1995.

"DPC2203 and EPC2203 VOIP Cable Modem User'S Guide", 1-58, Oct. 1, 2006.

"Cisco Model DPC2607 and EPC2607 Channel-Bonded EMTA User Guide", 1-51, Feb. 1, 2008.

"DPR2325, EPR2325, DPR2320, and EPR2320 Cable Modem Gateway With Wireless Access Point User's Guide", 1-125, Aug. 1, 2006.

"DPX2213 TM VOIP Cable Modem User's Guide", 1-52, Aug. 1, 2006.

"Model DPX203TM and EPX2203 TM VOIP Cable Modem User's Guide", 1-51, Aug. 1, 2006.

"Webstar TM DPX2203CTM and EPX2203C TM VOIP Cable Modem User's Guide", 1-52, May 1, 2005.

"Data Xcellerator Cable Modem User's Guide", 1-46, Apr. 1, 1997.

"Hardware Troubleshooting for Cisco uBR9XX Series Cable Modems, Document ID: 10154", 1-3, Oct. 4, 2005.

"Beginners FAQ for uBR900 Series Cable Modem End Users, Document ID: 14561", 1-2, Oct. 31, 2008.

"Configuring the uBR900 Series Modem, Document ID: 43060", 1-11, Oct. 31, 2008.

"Connectivity Problems for uBR900 Cable Modems, Document ID: 43061", 1-5, Oct. 31, 2008.

"uBR900 Cable Modem Error Messages, Document ID: 43063", 1-5, Nov. 4, 2008.

"uBR900 Cable Modem Performance Issues, Document ID: 43062", 1-5, Oct. 31, 2008.

"Deliver Secure, High-Speed DOSCSIS Data and Voice Commercial Services With the Cisco uBR900 Series Cable Access Router Data Sheet", 1-4, Sep. 1, 2001.

"Miscellaneous Questions About uBR900 Series Cable Modems, Document ID: 107616", 1-3, Oct. 31, 2008.

"Cisco uBR900 Series Cable Access Router Q and A, Revision 1", 1-5, Nov. 15, 2001.

"Upgrading Cisco IOS Software on a uBR900 Series Cable Modem, Document ID: 107613", 1-5, Sep. 26, 2003.

"Release Notes for Cisco uBR904 Cable Access Router for Cisco IOS Release 11.3NA", Text Part Number: 78-5546-09, 1-22, Aug. 9, 1999.

"Release Notes for Cisco uBR904 Cable Access Router for Cisco IOS Release 12.0(7)T", Text Part Number: 78-6482-04, 1-30, Jul. 1, 2001.

"Using Cisco IOS Software, Appendix A", Cisco uBR905/uBR925 Cable Access Router Software Configuration Guide, 1-12, Jul. 1, 2001.

"Using the Cable Monitor Tool, Appendix B", Cisco uBR905/uBR925 Cable Access Router Software Configuration Guide, 1-24, Jul. 1, 2001.

"New and Changed Commands Reference, Appendix D", Cisco uBR905/uBR925 Cable Access Router Software Configuration Guide, 1-52, Jul. 1, 2001.

"Overview, Chapter 1", Cisco uBR905/uBR925 Cable Access Router Software Configuration Guide, 1-18, Jul. 1, 2001.

"Advanced Data-Only Configurations, Chapter 3", Cisco uBR905/uBR925 Cable Access Router Software Configuration guide, 1-16, Jul. 1, 2001.

"Preface, Cisco uBR905/uBR925 Cable Access Router Software Configuration Guide", 1-12, Jul. 1, 2001.

"Recall, End of Sales, End of Engineering and End of Life for Cisco uBR914 Cable Data Service Unit, Product Bulletin, No. 1380", 1-2, Aug. 1, 2001.

"End of Sales, Engineering, and Life for the Cisco uBR924 Cable Access Router", 1-4, Jul. 11, 2001.

"Technical Specifications, Appendix A, Cisco u8R924 Router Hardware Installation Guide", 1-6, Mar. 1, 2000.

"Connector and Cable Specifications, Appendix B, Cisco uBR924 Router Hardware Installation Guide", 1-6, Mar. 1, 2000.

"Installing the Cisco uBR924 Router, Chapter 3, Cisco uBR924 Router Hardware Installation Guide", 1-16, Mar. 1, 2000.

"Cable Hardware and Software: uBR7200, uBR7100, uBR1OK, uBR905 FAQ, Document ID: 63990", 1-5, Sep. 3, 2006.

Kong, Isaac et al, "Cablenet: A Local Area Network Reservation Scheme", Digest of Papers Spring Compcon 82, High Technology in the Information Industry, IEEE Computer Society International Conference, 1-7, Feb. 22, 1982.

"Cisco Systems, Inc., Cisco Consumer Products LLC, Scientific-Atlanta LLD, and Cisco Systems International B.V.'s Response to Complaint of Mosaid Technologies Inc., Response to Complaint", Investigation No. 337-TA-778, 1-72, Jul. 21, 2011.

Strassberg, Dan; "Home Automation Buses: Protocols Really Hit Home"; EDN Design Feature, Apr. 13, 1995 (9 pages).

Hoffman, J.; "Cable, Television, and the Consumer Electronic Bus"; Panasonic Technologies. Inc., pp. 165-173.

IS-60.04; Node Communications Protocol Part 6: Application Layer Specification; Revision Apr. 18, 1996 (129 pages)

Heite C et al"Powrnet—Das Neue Eib-Medium", Elektrotechnik und Informationstechnik, Springer Verlag, Wein, AT, vol. 114, No. 5, 1997, pp. 254-257.

IBM LAN Bridge and Switch Summary—undated (108 pages), Jan. 1996.

Continuation of IBM LAN Bridge and Switch Summary—undated (68 pages), Jan. 1996.

Motorola announces key new features to CyberSURFR Cable Modem System—undated (3 pages), Mar. 17, 1997.

* cited by examiner

LOCAL AREA NETWORK OF SERIAL INTELLIGENT CELLS

This is a continuation of copending parent application Ser. No. 10/793,769, filed on Mar. 10, 2004, which is a division of application Ser. No. 10/178,223, filed Jun. 25, 2002, now U.S. Pat. No. 7,016,368, which itself is a continuation of patent application Ser. No. 09/123,486, filed Jul. 28, 1998, now U.S. Pat. No. 6,480,510, issued Nov. 12, 2002.

FIELD AND BACKGROUND OF THE INVENTION

The present invention relates to local area networks and, more particularly, to local area network topologies based on serial intelligent cells.

Bus Topology

Most prior art local area networks (LAN) use a bus topology as shown by example in FIG. 1. A communication medium 102 is based on two conductors (usually twisted pair or coaxial cable), to which data terminal equipment (DTE) units 104, 106, 108, 110, and 112 are connected, via respective network adapters 114, 116, 118, 120, and 122. A network adapter can be stand-alone or housed within the respective DTE.

This prior art bus topology suffers from the following drawbacks:

1. From the point of view of data communication, the medium can vary significantly from one installation to another, and hence proper adaptation to the medium cannot always be obtained.

2. The bus topology is not optimal for communication, and hence:
  a) the maximum length of the medium is limited;
  b) the maximum number of units which may be connected to the bus is limited;
  c) complex circuitry is involved in the transceiver in the network adapter;
  d) the data rate is limited.

3. Terminators are usually required at the ends of the medium, thus complicating the installation.

4. Only one DTE can transmit at any given time on the bus, and all other are restricted to be listeners.

5. Complex arbitration techniques are needed to determine which DTE is able to transmit on the bus.

6. In case of short circuit in the bus, the whole bus malfunctions, and it is hard to locate the short circuit.

7. Addresses should be associated independently with any network adapter, and this is difficult to attain with bus topology.

Star Topology

A number of prior art network devices and interconnections summarized below utilize star topology.

The multiplexer is a common item of equipment used in communication, both for local area networks and wide-area networks (WAN's). It is used in order to provide access to a data communications backbone, or in order to allow sharing of bandwidth between multiple stations. As shown in FIG. 2, one side of a multiplexer 202 is usually connected to a single high data rate connection 204 ("highway"), but several such connections can also be used. The other side of multiplexer 202 has multiple low data rate connections 206, 208, 210, 212, and 214. The ellipsis . . . indicates that additional connections can be made. Each low data rate connection uses part of the bandwidth offered by the high data rate connection. These low data rate connections can be of the same type or different types, and can have different or identical data rates. The multiplexing technique most commonly used is time-domain multiplexing (TDM). However, frequency-domain multiplexing (FDM) is also used.

A popular multiplexer in use is the voice multiplexer, shown in FIG. 3. A pulse-code modulation (PCM) bus 304 handling 2.048 megabits per second, containing 30 channels of 64 kilobits per second is connected to one side of a PABX/PBX 302, and up to 30 telephone interfaces 308, 312, and 316 are connected to the other side via connections 306, 310, and 314. The ellipsis . . . indicates that additional connections can be made. In this configuration, each channel in the PCM bus can be switched or be permanently dedicated to a specific telephone line. An example of such system is disclosed in U.S. Pat. No. 3,924,077 to Blakeslee.

Similarly a small private branch exchange (PABX/PBX), as shown in FIG. 4, is widely used (usually in an office or business environment) where several outside lines 403, 404, and 405 are connected to one side of a PABX/PBX 402, and multiple telephones 408, 412, and 416 are connected to the other side via lines 406, 410, and 414, respectively. The ellipsis . . . indicates that additional connections can be made. The PABX/PBX connects an outside line to a requesting or requested telephone, and allows connection between telephones in the premises.

In the configurations described above, star topology is used in order to connect to the units to the multiplexer, which functions as the network hub. The disadvantages of star topology include the following:

1. A connection between each unit and the network hub is required, and the wiring required for this connection can involve a lengthy run.

Thus, when adding new unit, an additional, possibly lengthy, connection between the new unit and the network hub must be added.

2. No fault protection is provided: Any short circuit or open circuit will disrupt service to the affected units.

3. The multiplexer can impose extensive space and power requirements.

Computer Interfaces

Various interface standards have been established in order to allow interoperability between the PC (personal computer) or workstation and its various connected elements. These standards usually relate to both mechanical and electrical interfaces, and include industry standard architecture (ISA), extended industry standard architecture (EISA), Personal Computer Memory Card Industry Association (PCMCIA), intelligent drive electronics (IDE), small computer system interface (SCSI), and others. Each added hardware unit usually utilizes a specific software driver for interoperability with the specific platform. These protocols are applicable to small distances only, and allow units to be housed within or nearby the PC or workstation enclosures. For example, equipping a PC for video capture could involve a plug-in ISA card housed within the PC on the motherboard, a video camera connected to the card, and a software driver. This configuration does not allow remote video monitoring.

Relevant Prior Art

The use of the same wire pair or pairs for both power and data communication is well known, and is widely used in telecommunications, from "Plain Old Telephone Service" ("POTS") to Integrated Services Digital Network (ISDN) and broadband services in the local-loop including other Digital Subscriber Line (xDSL) technologies. Such a concept is described, for example, in U.S. Pat. No. 4,825,349 to Marcel, describing using two pairs for such a scheme. A DC-to-DC converter for such DC feeding is described, for example, in U.S. Pat. No. 4,507,721 to Yamano et al.

The concept of power line communication (PLC) is also widely known. However, in most cases the connection is similar to a LAN environment, in which a single transmitter occupies the entire medium. Examples of such techniques include X-10 and the consumer electronics bus (CEBus, described in the EIA-600 standard). Much of this technology uses complex spread-spectrum techniques in order to accommodate problematic media (characterized by high amounts of noise and interference). Even with such improved technologies, however, the data rate obtained is relatively low.

Prior art in this field includes U.S. Pat. No. 5,684,826 to Ratner, U.S. Pat. No. 5,491,463 to Sargeant et al., U.S. Pat. No. 5,504,454 to Daggett et al., U.S. Pat. No. 5,351,272 to Abraham, U.S. Pat. No. 5,404,127 to Lee et al., U.S. Pat. No. 5,065,133 to Howard, U.S. Pat. No. 5,581,801 to Spriester et al., U.S. Pat. No. 4,772,870 to Reyes, and U.S. Pat. No. 4,782,322 to Lechner et al. Other patents can be found in U.S. Class 340/310 (sub-classes A/R and others) and International Class H04M 11/04.

The concept of using existing telephone wiring also for data communication is first disclosed in U.S. Pat. No. 5,010,399 to Goodman et al., where video signals superimposed over the telephone signals are used. However, the scheme used is of the bus type and has the drawbacks of that topology. Similarly, the idea of data transmission over a public switched telephone network (PSTN) using the higher frequency band is widely used in the xDSL systems, as is disclosed in U.S. Pat. No. 5,247,347 to Litteral et al. The patent discloses an asymmetric digital subscriber line (ADSL) system. However, only a single point-to-point transmission is described over the local-loop, and existing in-house wiring is not discussed, and thus this prior art does not disclose how to configure a full multipoint network. Multiplexing xDSL data and the POTS/ISDN data uses FDM principles, based on the fact that the POTS/ISDN services occupy the lower portion of the spectrum, allowing for the xDSL system to use the higher bandwidth.

A home bus network using dedicated wiring is disclosed in U.S. Pat. No. 4,896,349 to Kubo et al., and a home automation network based on a power line controller (PLC) is disclosed in U.S. Pat. No. 5,579,221 to Mun. U.S. Pat. No. 4,714,912 to Roberts et al. is the first to suggest communicating data over power lines not in bus topology but as 'break-and-insert'. However, only single conductor is used, and the receivers are all connected again using a bus topology.

In addition, U.S. patent application Ser. No. 08/734,921, Israel Patent Application No. 119454, and PCT Patent Application No. PCT/IL97/00195 of the present inventor disclose a distributed serial control system of line-powered modules in a network topology for sensing and control. These documents, however, do not disclose a local area network for data communications.

The prior art documents mentioned above are representative examples in the field. Certain applications are covered by more than one issued patent.

There is thus a widely recognized need for, and it would be highly advantageous to have, a means of implementing a local area network for data communications which does not suffer from the limitations inherent in the current methods. This goal is met by the present invention.

SUMMARY OF THE INVENTION

The present invention is of a local area network for data communication, sensing, and control based on serially connected modules referred to as "serial intelligent cells" (SIC's). An example of a local area network of such devices according to the present invention is illustrated in FIG. 7, to which reference is now briefly made. In this example, SIC's 700, 702, 704, 706, and 708 are connected by one or more conducting wire pairs (such as a twisted pair 710). This allows chaining, such as SIC 700 to SIC 702 to SIC 704. However, SIC 700, SIC 706, and SIC 708, located at the ends are equipped with single connection. SIC 704 is equipped with three connections, and even more connections are possible. A SIC may be interfaced to one or more DTE's, as illustrated by a DTE 714 interfaced to SIC 700 and by DTE's 716 and 718 interfaced to SIC 704. SIC's need not have an interface, however, as is illustrated by SIC 706 and SIC 702. SIC 702, though, serves as a repeater, connecting SIC 700 and SIC 704.

It is to be noted that the networks according to the present invention utilize electrically-conducting media to interconnect the SIC's. Each electrically-conducting medium connects exactly two SIC's into a communicating pair of SIC's which communicate bidirectionally and independently of other communicating pairs in the local area network. Electrically-conducting media are media which transmit signals by conducting electrical current or by propagating electrical potential from one point to another. Electrically-conducting media include, but are not limited to wires, twisted pair, and coaxial cable. But electrically-conducting media do not include media such as fiber optic lines, waveguides, microwave, radio, and infrared communication media.

As noted above, SIC's in a communicating pair communicate bidirectionally. For example, SIC 704 can initiate communication (as a sender) to SIC 702 (as a receiver), but SIC 704 can just as well initiate simultaneous communication (as a sender) to SIC 700 (as a receiver). Bidirectional communication can take place simultaneously, and herein is taken to be equivalent to "full duplex" communication. In addition, as noted above, the communication between the SIC's of a communicating pair is independent of the communication between the SIC's of any other communicating pair, in that these communications neither preclude nor affect one another in any way. Furthermore, every communication between SIC's is a "point-to-point communication", which term herein denotes a communication that takes place between exactly one sender and exactly one receiver. This is in contrast to a bus-based communication, in which there are many (potential) receivers and many (potential) senders. Consequently, in the topology according to the present invention, there is automatically a termination in the physical layer at each end of a connection (a SIC), both simplifying the installation and insuring more reliable communication.

The topology according to the present invention is superior to the prior art bus topology in the following ways:

1. There is no physical limit to the number of SIC's which may be installed in the network, and hence no physical limit to the number of DTE's in the network.

2. Point-to-point communication allows higher data rates over greater distances.

3. Point-to-point communication requires less complex circuitry than bus circuitry.

4. Several SIC's can transmit and receive simultaneously. For example, SIC 700 can communicate with SIC 702 while SIC 704 communicates simultaneously with SIC 706.

5. There is no need for arbitration, allowing more efficient utilization of the network. Furthermore, priorities can be assigned to each SIC or, alternatively, to each specific message to allow the data routing to take care of priorities.

6. Addresses may be assigned by the network.

7. In the case of failure of any conductor or SIC, the network can sense the fault immediately, and the specific location of the fault (up to the specific SIC pair) is easily obtained.

Therefore, according to the present invention there is provided a local area network for data communication, sensing, and control including a plurality of serial intelligent cells interconnected exclusively by electrically-conducting media into at least one communicating pair, wherein: (a) each of the electrically-conducting media interconnects no more than two of the serial intelligent cells; (b) each of the communicating pair includes one of the electrically-conducting media and exactly two of the serial intelligent cells; (c) each of the communicating pair engages in a communication exclusively over the electrically-conducting media; and (d) each of the communicating pair engages in the communication bidirectionally and independently of the communication of any other of the communicating pair.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a local area network according to the present invention may be better understood with reference to the drawings and the accompanying description.

Figure 1:
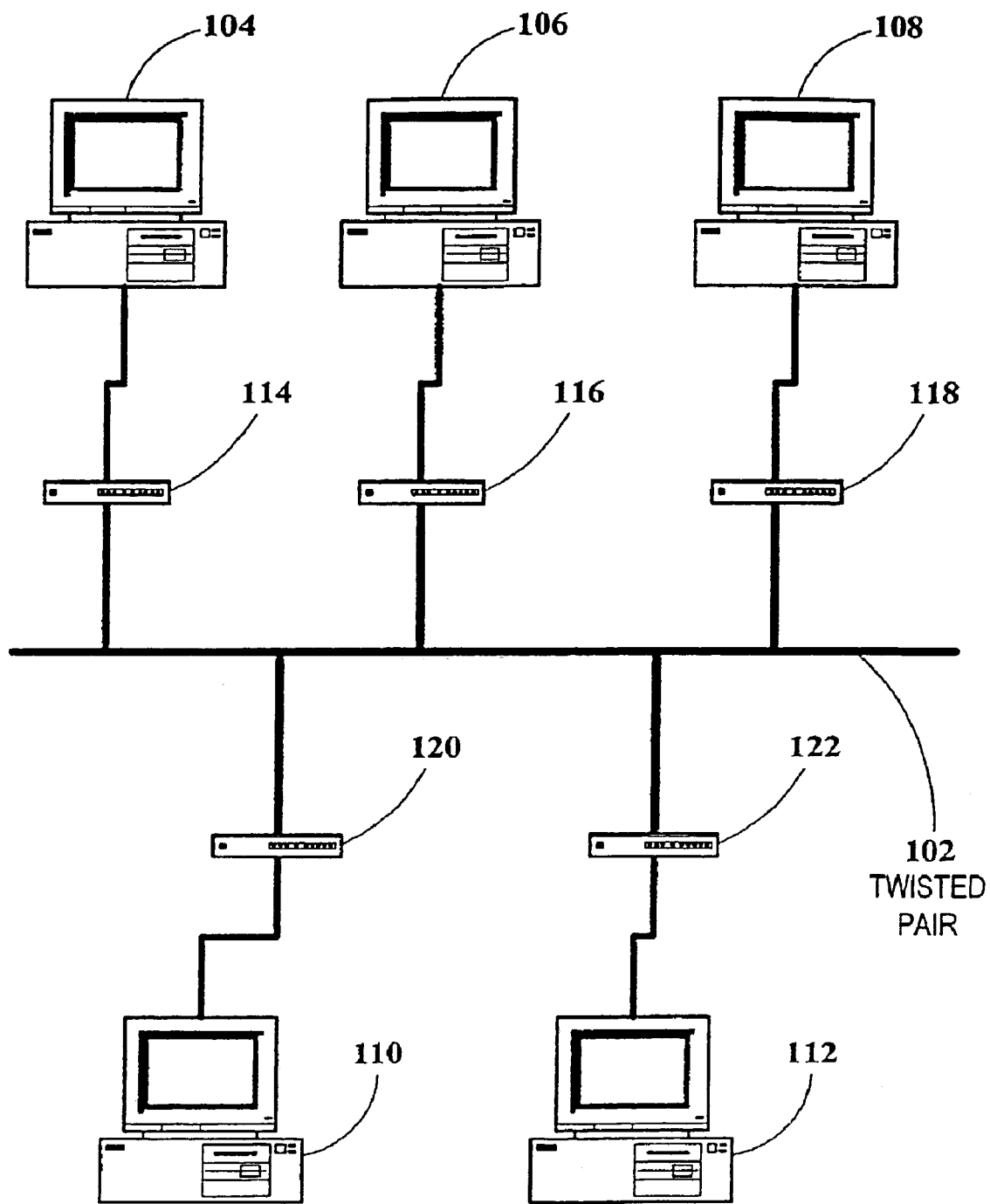
FIG. 1 shows a common prior art LAN bus topology.
Figure 2:
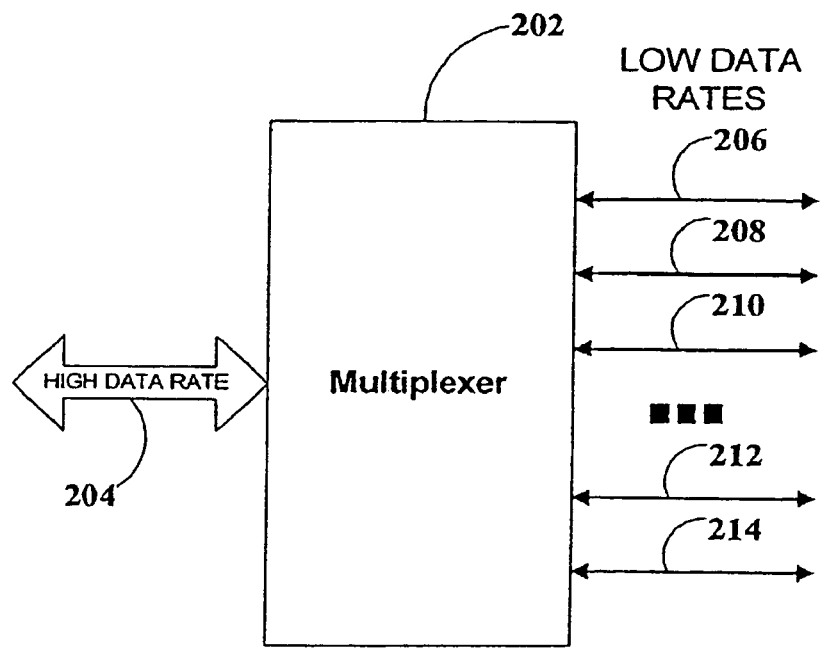
FIG. 2 shows a typical prior art multiplexer.
Figure 3:
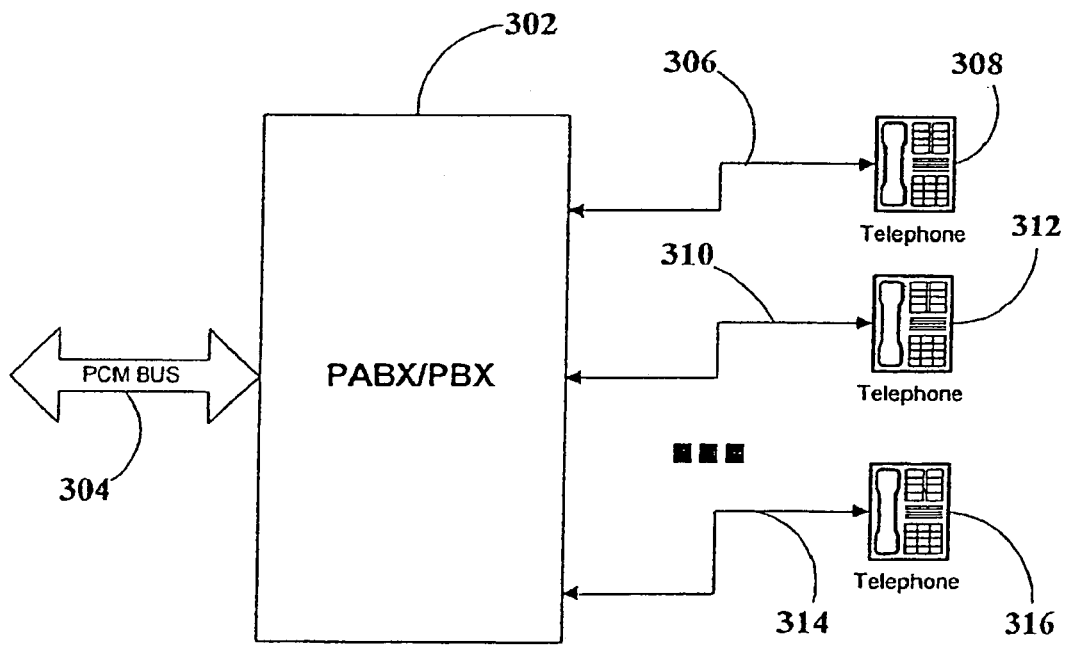
FIG. 3 shows a prior art voice multiplexer (star topology).
Figure 4:
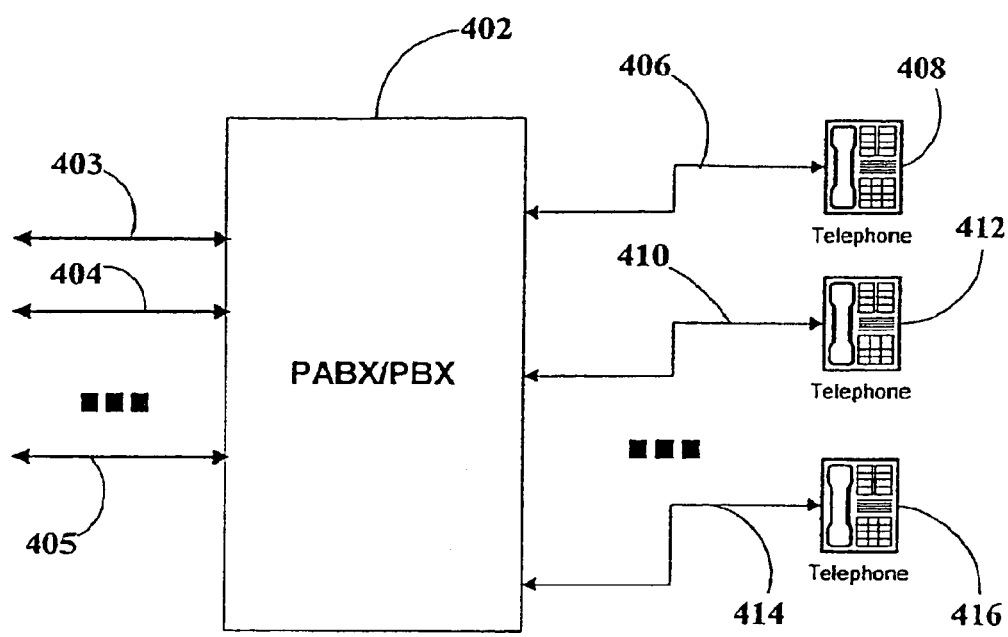
FIG. 4 shows a prior art voice exchange configuration (star topology).
Figure 5:
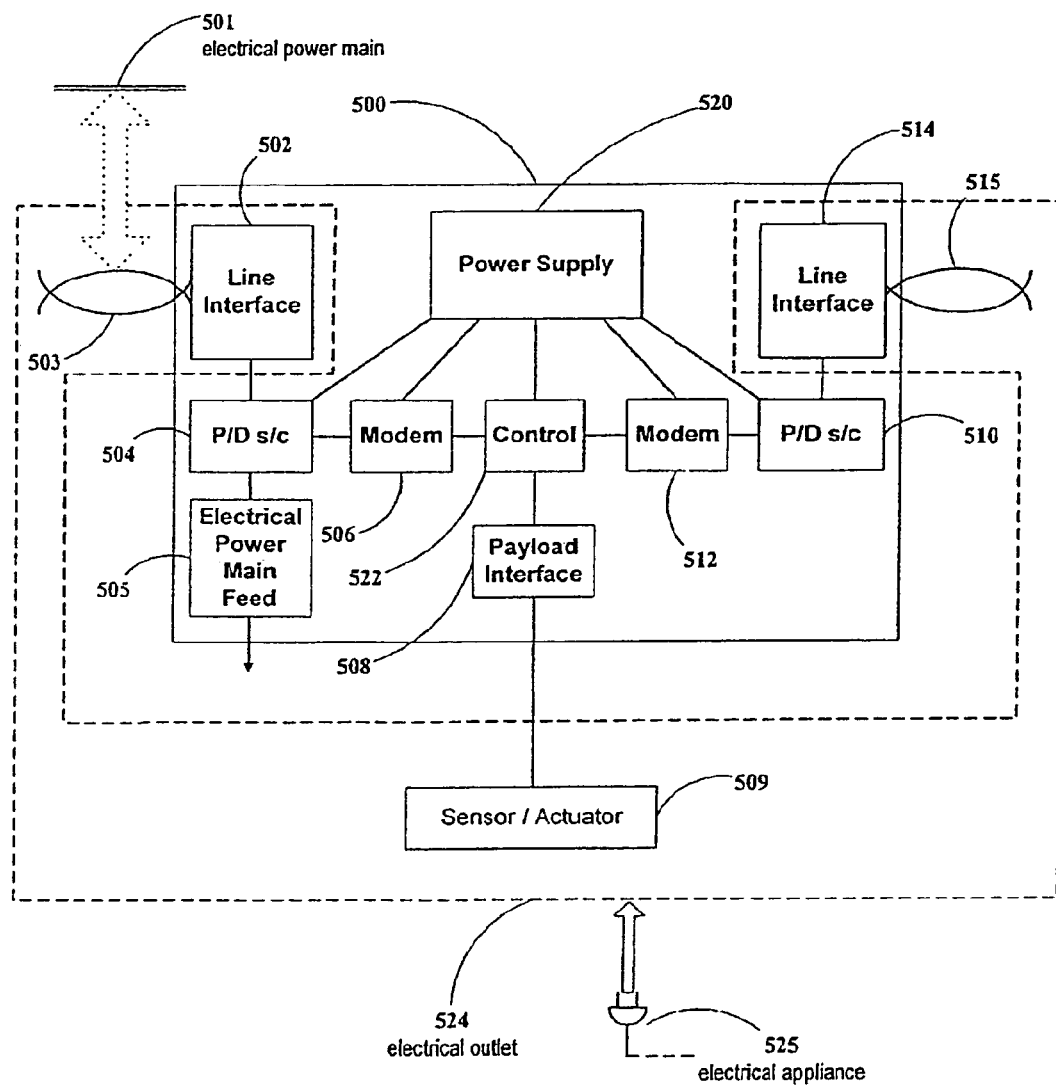
FIG. 5 is a block diagram of a SIC for control applications according to the present invention.

FIG. 5 is a block diagram of a representative SIC 500 for use in control applications. A first line interface 502 is a first port for connecting to the previous SIC to receive incoming electrical power and local area network data over electrically-conducting medium 503, which may optionally be connected to an electrical power main 501, so that SIC 500 may be powered from electrical power main 501. Line interface 502 may include the connector, fuse, lightning arrester and other protection such as noise filters, etc. The incoming power/data signal is fed to a first power/data splitter/combiner 504, which de-couples the (high frequency alternating current) data signal from the power. Such a power/data splitter/combiner 504 (denoted for brevity in FIG. 5 as "P/D s/c") can be implemented by methods well-known in the art, such as using a center-tap transformer, or alternatively with active components. The data signal is fed to a first modem 506 allowing bidirectional communication, while the power is fed to a power supply 520. The above scheme assumes that both power and data are carried by the same network wires (line-powering). FIG. 5 illustrates the case where the SIC is line-powered by alternating current (for example, by the electrical power main), in which case power/data splitter/combiner 504 is an AC power/data splitter/combiner, which separates a low-frequency alternating current power from the higher-frequency data signal. Otherwise, in the case where the SIC is line-powered by direct current, power/data splitter/combiner 504 is a DC power/data splitter/combiner, which separates direct current power from the data signal. In some cases the line-powering method is not used. For example, power can be carried by dedicated lines routed in conjunction with the data wiring. Alternatively, the SIC can be locally powered by a local power-supply. In both cases, the power/data splitter/combiner is not required, and the power lines are directly connected to the SIC power-supply, while the data connects directly to the modems. Parts of the SIC are shown optionally housed within an electrical outlet 524, such that connections to the local area network as well as to the electrical power mains may be made from electrical outlet 524. Electrical power from electrical outlet 524 can be fed to an optional electrical appliance 525. In addition, SIC 500 contains an optional electrical power main feed 505 which can also power electrical appliances or other devices.

Power-supply 520 provides the required voltages for the SIC and payload operation, and also outputs the power to a second Power/data splitter/combiner 510, for coupling to the next SIC. Communication with the next (fed) SIC is performed via a second modem 512 connected to a second line interface 514 via power/data splitter/combiner 510, similar to power/data splitter/combiner 504 as previously described. Line interface 514 feeds to electrically-conducting medium 515, which connects to the next SIC. Modems 506 and 512 can be standard RS-485, RS-232, or any simple similar data interface transceiver. Alternatively, a complex transceiver can be used for achieving long ranges or high-speed operation. CPU and firmware contained in a control block 522 control and monitor the unit operation and communication, as well as control the payload through a payload interface 508 interfacing with a payload illustrated by a sensor/actuator 509. For example, interface 508 can implement a 4-20 ma standard interface. In a similar way, SIC 500 can be used for communication over the power line. To do this, payload interface 508 is replaced by a communication port and sensor/actuator 509 will be replaced by a DTE.

Figure 6:
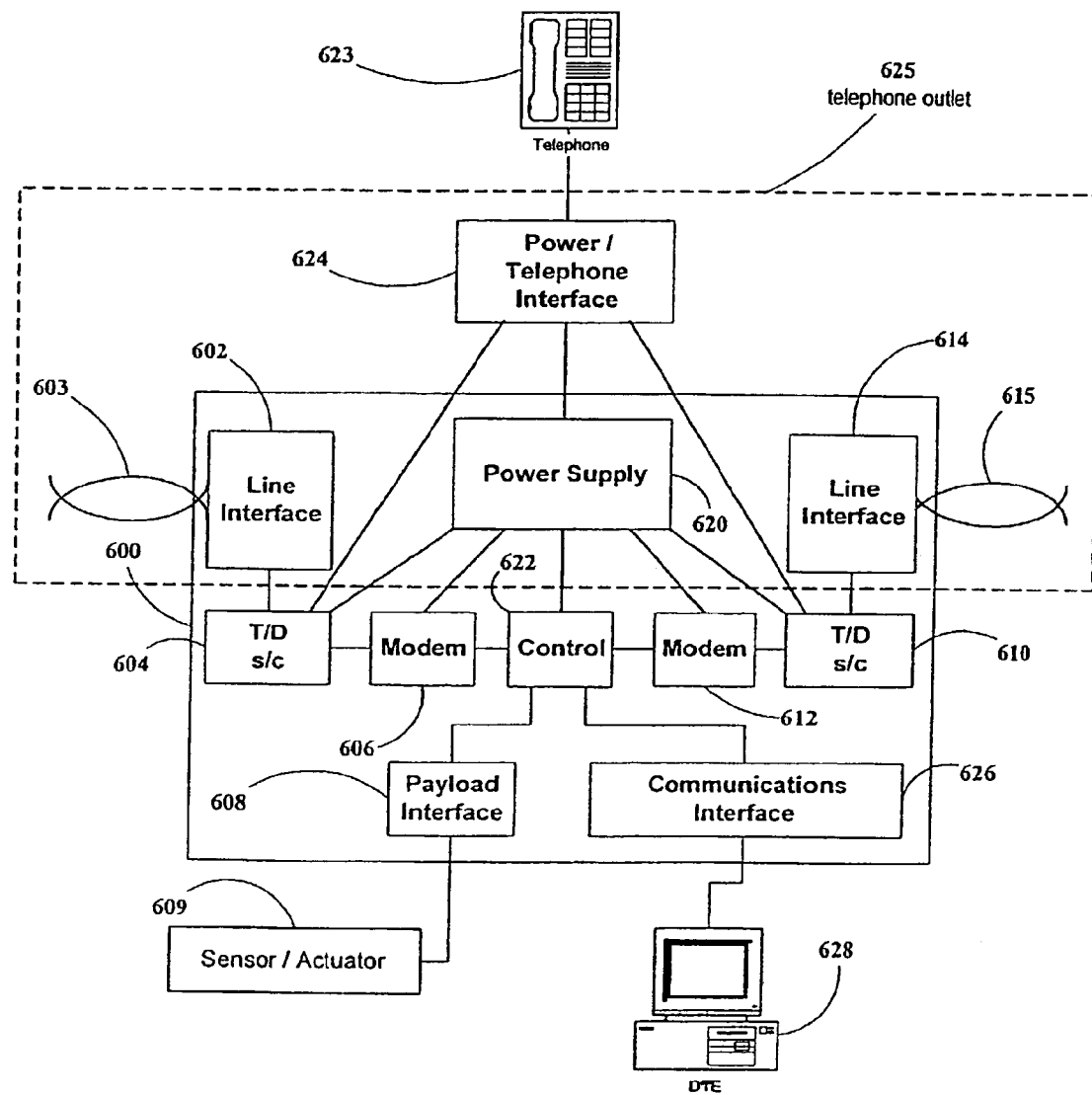
FIG. 6 is a block diagram of a SIC for data communications according to the present invention.

A SIC for use in data communications as shown in FIG. 6 is substantially similar to that used in control applications as shown in FIG. 5, but has some specific differences as noted. Also illustrated in FIG. 6 is the case where the local area network data is carried over electrically-conducting media which are part of the telephone wiring of a building. A SIC 600 has a first line interface 602 as a first port for connecting to the previous SIC to receive incoming power, local area network data, and telephony data via an electrically-conducting medium 603. Line interface 602 may include the connector, fuse, lightning arrester and other protection such as noise filters, etc. The incoming power/telephony/data signal is fed to a first telephony/data splitter/combiner 604 (denoted for brevity in FIG. 6 as "T/D s/c"), which de-couples the local area network data from the power and telephony data. Such a telephony/data splitter/combiner 604 can be implemented by methods well-known in the art, such as using a high-pass/low pass filter, or alternatively with active components. The local area network data signal is fed to a first modem 606 allowing bidirectional communication, while the power (DC) is fed to a power supply 620, and the telephony data is fed to power/telephone interface 624.

Power-supply 620 provides the required voltages for the SIC and payload operation, and also outputs the power to a second telephony/data splitter/combiner 610, for coupling to the next SIC. Communication with the next (fed) SIC is performed via a second modem 612 connected to a second line interface 614 via telephony/data splitter/combiner 610, similar to telephony/data splitter/combiner 604 as previously described. Line interface 614 connects to an electrically-conducting medium 615, which connects to the next SIC. Modems 606 and 612 can be standard RS-485, RS-232 or any simple similar data interface transceiver. Alternatively, a complex transceiver can be used for achieving long ranges or high-speed operation. CPU and firmware contained in a control block 622 control and monitor the unit operation and communication, as well as control the payload through a payload interface 608 interfacing with a payload 609, which may include sensors and actuators. For example, interface 608 can implement a 4-20 ma standard interface. SIC 600 also includes an optional power/telephone interface 624, contained for example in a telephone outlet 625, as well as one or more communications interfaces, such as a communication interface 626 connected to a DTE 628.

In the case of DC line feeding, the power supply may be equipped with a line reversal function (for example, a diode-based bridge) in order to accommodate a possible wire reversal.

Note that a SIC can be implemented as single device with all component parts contained within one enclosure, but does not necessarily have to be so implemented. In the case of a SIC used for data communications or control applications, the hardware may be optionally divided between the SIC module and the DTE/Payload units. In the case of a SIC used for telephone applications, the hardware may optionally be divided between the SIC, the DTE payload unit, and the telephone outlet, such as telephone outlet 625, which allows connections to both telephone services (such as through a telephone 623) and the local area network (such through DTE 628). Telephone outlet 625 may be a wall outlet or jack. All or part of the SIC may be housed within a telephone outlet such as telephone outlet 625, if desired. Furthermore, for SIC's used only as repeaters, a payload interface is not necessary.

Power/data splitter/combiner 510 (FIG. 5) can use various techniques known in the art. Coupling can be implemented, for example, as disclosed in U.S. Pat. No. 4,745,391 to Gajjar. Power-supply 520 (FIG. 5) can be connected to the network using dedicated adapter or via specific SIC. The payload can also be connected using standard Ethernet or other LAN interface, hence emulating the network using the SIC's. This configuration makes use of standard interfaces, but operates at higher throughput and data-rates than a conventional LAN.

SIC Addressing

A SIC can include an address. Addresses of SIC's on the network can be assigned via automatic assignment by the local area network itself by algorithms known in the art, for example as disclosed in U.S. Pat. No. 5,535,336 to Smith et al. Addresses can also be assigned via manual assignment, such as by the setting of mechanical switches on the SIC unit. Addresses can also be determined by the DTE connected to the SIC, either by means of higher layers as done in most LAN systems, or physically be means of the connection to the SIC (such as by address lines).

SIC Powering

Figure 7:
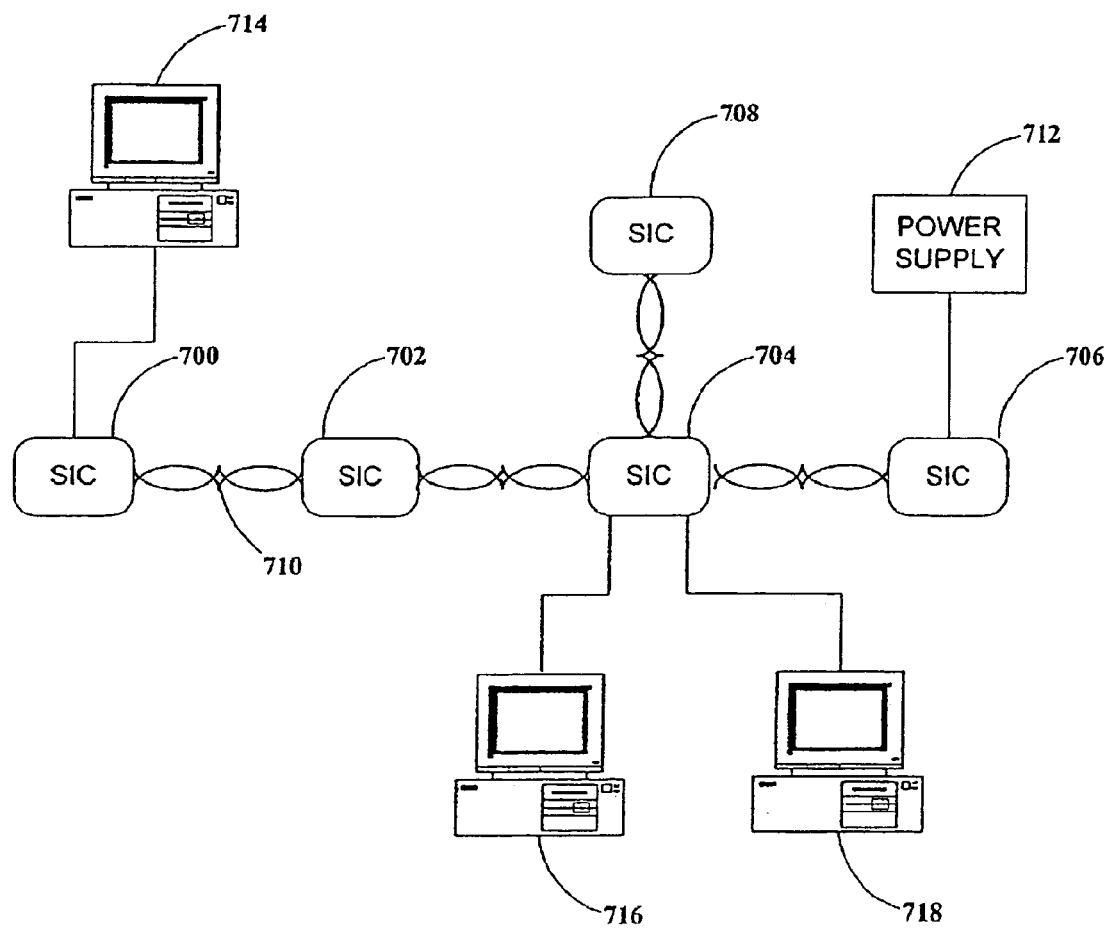
FIG. 7 shows a LAN topology utilizing the devices of the present invention.

A SIC can receive electrical power locally, via a power source located near the SIC. However, one power source may be used to power some or all the SIC's in the local area network using dedicated power lines. These lines can be routed with the data communication wires. Alternatively, the same electrically-conducting media (the data communication wires) can be used to carry both electrical power and local area network data to the SIC's, by means of techniques well-known in the art, for example as in telephone systems. In such a case, a unit is required for coupling the power supply to the local area network. This can make use of a SIC (such as SIC 706 in FIG. 7) or in a specific dedicated module. Since electrical power is typically distributed at low frequencies (e.g., 60 Hertz), whereas local area network data is typically at a much higher frequency, electrical power can be combined with local area network data using frequency-domain multiplexing. A SIC can therefore be powered from the electrical power mains, and can also deliver electrical power, as illustrated in FIG. 5 and detailed herein above.

The DTE's, sensors, and actuators connected to the SIC's can also be locally powered from the SIC's, or can use the same power resources via the same channels as the SIC's. Part or all of a SIC can be housed within an electrical outlet so that the electrical outlet allows connection to the local area network as well as to electrical power.

Control

Although mainly intended to be used as communication network, the system according to the present invention can also be used as a platform to implement a sensing, control, and automation system. This is achieved by adding to one or more of the SIC's interfaces to sensors or actuators. The signals received by the sensors are transmitted over the network via logic contained in the SIC's or in the DTE's, which thereupon operate the relevant actuators. This automation function can be monitored by one or more of the DTE's.

The operation of the control may be associated with data communicated over the network (for example, sensing the availability of power to a DTE) or may be independent of it, to allow control decisions to be made locally.

DTE Interface

The DTE interface can be a proprietary interface or any standard serial or parallel interface, such as ITU-T V.35, ITU-T V.24, etc. In addition, a telephone interface (POTS) or ISDN may be used. This can suit intercom or PBX applications.

Fault Protection

Figure 8:
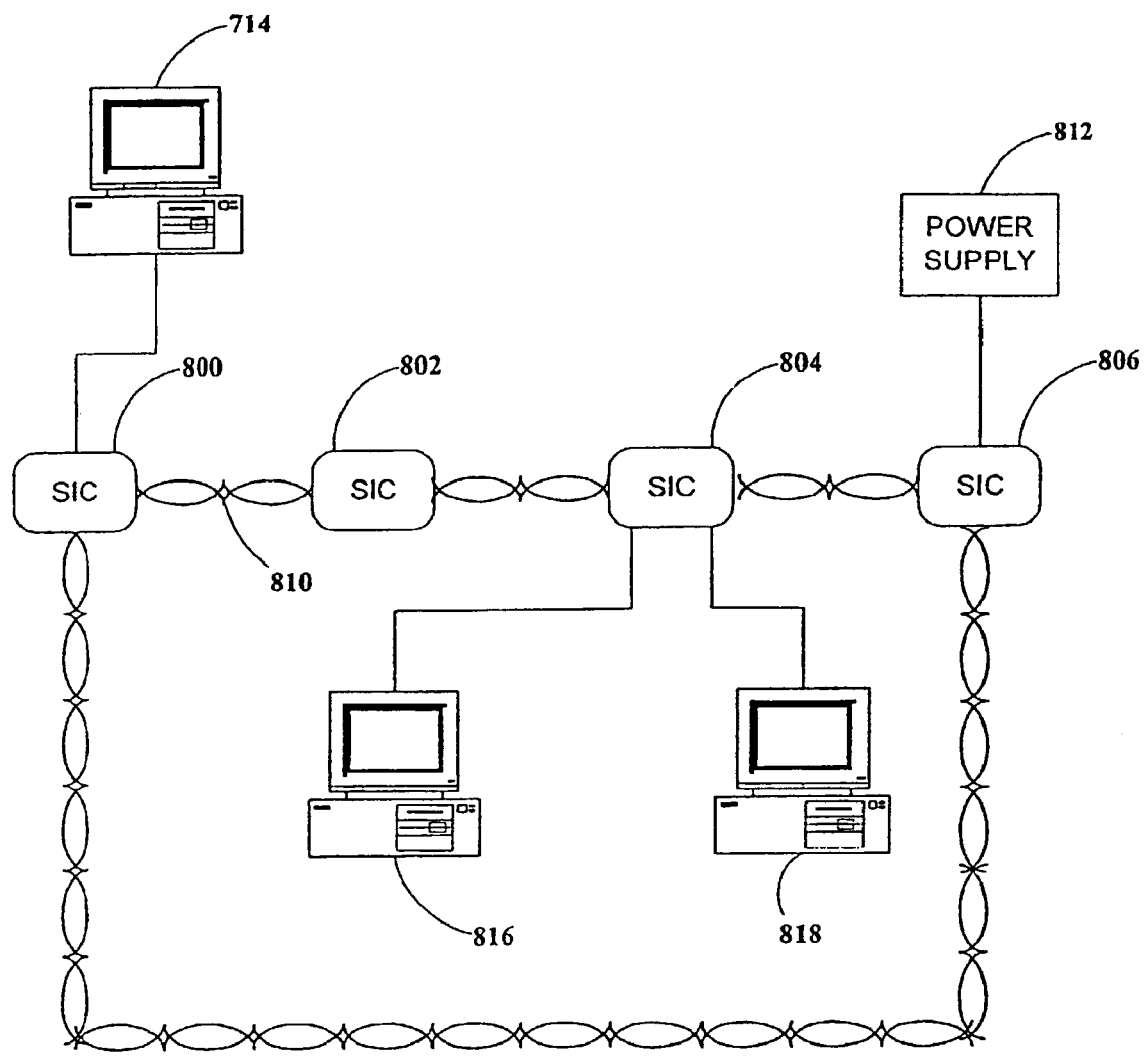
FIG. 8 shows an alternative LAN topology utilizing the devices of the present invention.

The SIC topology described above can be modified to allow for single failure correction. In such a case, the SIC's are connected in a network with redundant paths, such as a circular topology as shown in FIG. 8. In this example, a SIC 800 is connected to a SIC 802, which is in turn connected to a SIC 804, which is in turn connected to a SIC 806, which is in turn connected to SIC 800. When connected in such configuration, any single failure in any conductor, such as in conductor pair 810, will not effect the system operation, as data routing from any SIC to any other SIC can be achieved via an alternate path. The term "circular topology" herein denotes the topology of any local area network of SIC's according to the present invention which contains at least two communication paths between two different SIC's. For example, in FIG. 8, there are two communication paths from SIC 800 to SIC 804: one communication path is from SIC 800 to SIC 802 to SIC 804, and the other path is from SIC 800 to SIC 806 to SIC 804. Circular topology provides redundant communication paths that increase the immunity of the local area network to communication faults. It should be noted that the circular topology according to the present invention, as shown in FIG. 8, differs significantly from the well-known "Token Ring topology" of the prior art, as discussed following.

Although circular topology as defined herein can be superficially similar to the Token Ring topology, there are major differences between them. One difference is in the data framing. The Token Ring uses the same frame structure throughout all communication links in the network, and this requires that the same framing must be recognized by all the cells in the network. In the SIC network according to the present invention, however, each communication link (between any two connected SIC's) is totally independent from all other network communication. Hence, a first SIC can communicate with a second SIC using one type of frame structure and protocol, while the same first SIC can communicate with a third SIC using a different type of frame structure and protocol.

In addition, in a Token Ring network, there is single direction of data flow at any given time from a single transmitter to one or more receivers, and usually, the direction of data flow is constant. The SIC network according to the present invention, however, does not impose any limitation on the data flow in any of the communication links. Full duplex, half duplex or unidirectional communication is possible, and can even vary from link to link throughout the network. This allows the SIC network to support two independent communication routes simultaneously, provided different segments are used. In FIG. 8, for example, SIC 800 can communicate with SIC 802 while SIC 804 simultaneously communicates different data with SIC 806. This capability is not supported by any of the other network configurations.

The above differences affect, for example, the vulnerability of the respective networks to faults. In case of single break or short-circuit anywhere in the medium, the Token Ring network will collapse, disabling any further communication in the system. As another example, in the network disclosed in U.S. Pat. No. 4,918,690 to Markkula et al. (hereinafter referred to as "Markkula"), this fault affects the physical layer by disabling the media's signal-carrying capability. The Token Ring network will not function at all since the data layer functionality based on unidirectional transmission will not be supported. In contrast, however, a SIC network according to the present invention, will continue to function fully, except for the specific faulty link itself. All other links continue to function normally. Furthermore, the ability to localize the fault is not easily performed either in a Token Ring network or in the Markkula network. In the SIC network according to the present invention, however, it is simple and straightforward to trace the fault to the affected link.

Data Distribution Over Electrical Power Lines

An important configuration for a network according to the present invention uses the electrical power wiring of a building as a communication media. This can be used, for example, to implement an inexpensive 'home LAN'. Typical house mains have a connection to single feeder with numerous distribution points and outlets. The principles according to the present invention specify a SIC to be located within each outlet and at each distribution point. This will allow SIC-based communications network, where communication takes place between each pair of SIC's connected via the wiring. In such a case it is also expected that the mains will also be used to power the SIC's. Aside from using the same wiring media, the electrical distribution and the communication system sharing the same mains can be totally decoupled.

Another configuration involves adding the SIC to the Mains wiring at points distinguished from the mains outlets. The preferred embodiment, however, consists of using the outlets points for both the electrical supply and the DTE connection points. This involves replacing all electrical outlets and distribution points with 'smart' outlets, having both electrical connections and a communications jack. In addition, such unit may include visual indicators (e.g. LED's) to show the communication status, and may also include switches or other means to determine the outlet address. Such a communication system could be used for applications associated with power distribution, as for example to control the load connected to a specific outlet, for remote on/off operation of appliances, timing of operations, delayed start, disconnection after pre-set time period, and so forth. Such a communication system could also be used to monitor the power consumed by specific outlets, such as for Demand Side Management (DSM) or Automatic Meter Reading (AMR), allowing remote meter reading.

The above described topology may also apply to existing wiring. One common example may be power wiring to consumers located in different locations. Such wiring typically relies on bus topology with taps. In order to use SIC technology, the wiring must be broken, and a SIC installed between both ends.

In a similar manner, a communication network employing the electrical power wiring of vehicles and vessel can be implemented, such as for aircraft, ships, trains, buses, automobiles, and so forth.

Implementing a Local Communication/Telephone System using SIC's

In this application, existing telephone wiring (either POTS or ISDN) is used as the electrically-conducting media for the local area network, and is used for both local area network data communication and for telephony. The term "telephony" herein denotes any telephone or telephonic communication, including both including voice (POTS) and data (ISDN). Telephone outlets are usually connected in point-to-point topology without a distribution point. To set up a network, each outlet is replaced with SIC-based outlet. If there are distribution points, these distribution points must also be SIC equipped. This configuration results in a high-performance LAN between the telephone outlets. Aside from sharing the same media, the local area network can be decoupled from the telephone system. Alternatively, the local area network and the telephone system can be combined, such that telephony is digitally integrated into the local area network data.

The outside telephone service can be treated according to one of the following alternatives:

1. No telephone support. In this configuration, the connection to the network (usually to the public network) is cut, and the network is fully internal, with no external telephone service.

2. Telephone as Payload. In this configuration, the telephone capability is retained, and telephony data may be integrated into the data communication of the local area network. One of the SIC's (usually the one closest to a public telephone network interface) or other dedicated module interconnects (via the communication interface for example) to the network interface (NI). This unit emulates a telephone interface to the NI, so that public network operation is transparent and continues to perform as normal. However, the signals associated with the telephone interface, either the voice itself and the control/signaling (on hook/off hook, ringing, etc.) are digitized and transmitted in the network as data stream, as part of the communication taking place in the network. In the SIC's interfaced to telephones, these signals are converted back to analog (or in any original form) and thus can be used with standard telephones. In this case, telephone functionality is fully retained. However, failure in the communication network may result in loss of the telephone service. This can be improved by means of a system which disconnects the SIC's circuitry and restores the original wiring routing (this can be easily implemented by relays, which bypass the SIC's upon failure detection, manual intervention, or other relevant occasion).

3. Communication over POTS or ISDN. In this method, the electrically-conducting media interconnecting SIC's is the telephone wiring of a building. This method involves the known mechanism 'POTS Splitting', currently used in conjunction with xDSL technologies. This requires a filter which separates the low-frequency portion of the spectrum (usually carrying the POTS associated signals and power) from the high-frequency portion of the spectrum (used for communication). In such an application, the AC/DC units in the SIC are replaced with such POTS splitter modules. The low-frequency band (POTS related) is passed transparently (similar to the power pass), and branched to the telephone jack. The high-frequency band is used for the communication between the SIC's. This combining of high-frequency local area network communication on the same electrically-conducting media with low-frequency telephony data is a form of frequency-domain multiplexing.

In the latter two alternatives, each in-wall telephone outlet is replaced with a SIC based outlet having both a telephone jack and one (or more) communication jacks.

Computer Bus Extender

Figure 10:
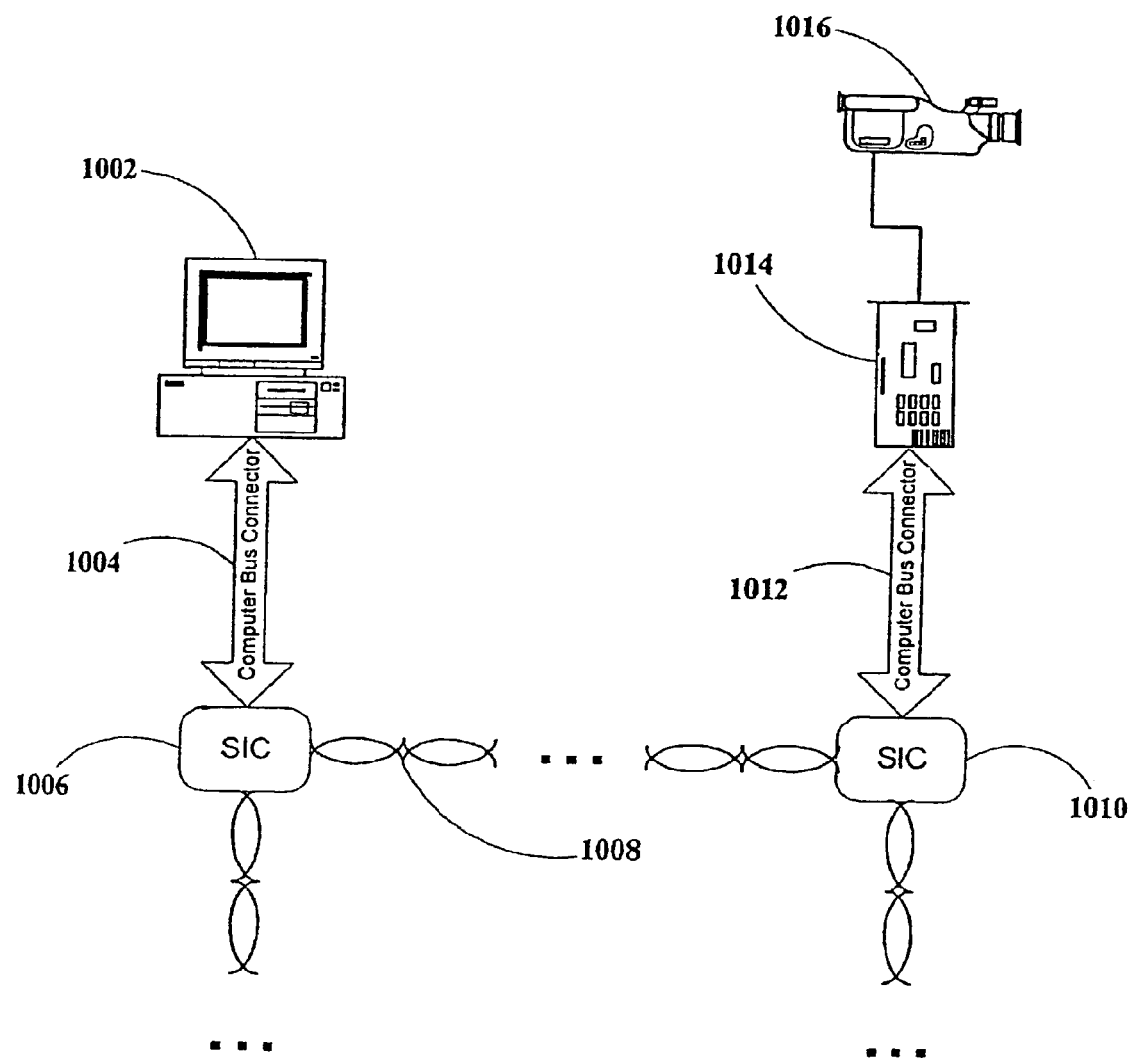
FIG. 10 shows a local area network according to the present invention used as a computer bus extender.

The SIC network can be used as a computer bus extender, such as an 'ISA bus extenders', as illustrated in FIG. 10. In this configuration, a SIC 1006 is equipped with a computer bus connector 1004 which is connected, for example, to one of the ISA bus slots in a computer 1002, to transport data between the local area network and computer 1002. Another SIC 1010, remotely located, also has a computer bus connector 1012, such as an ISA bus extender. This allows for a transparent ISA bus capability, where the ISA bus data will be transported in both directions over electrically-conducting medium 1008. The ellipses ( . . . ) indicate that additional SIC's and electrically-conducting media may be present in the local area network between SIC 1006 and SIC 1010. Shown as an example, a video frame grabber card 1014 is plugged into computer bus connector 1012, and a video camera 1016 is connected to video frame grabber card 1014. Normally, video frame grabber card 1014 is plugged directly into an ISA bus slot, such as in computer 1002. Here, however, the local area network acts as a bus extender so that video frame grabber 1014 and video camera 1016 can be located remotely from computer 1002. The normal software driver for the ISA bus slot in computer 1002 can used, since computer 1002 is unaware of the fact that only ISA emulation is taking place. This way, the capability of having general remote PC components and peripherals can be easily achieved. This configuration features the above-described advantages, and this method can be used to attain various goals, such as fault protection. Similarly, this method can be used to connect several units remotely to a computer, using different ports in the computer.

Implementing Multiplexers and PABX/PBX Functionality

Figure 9:
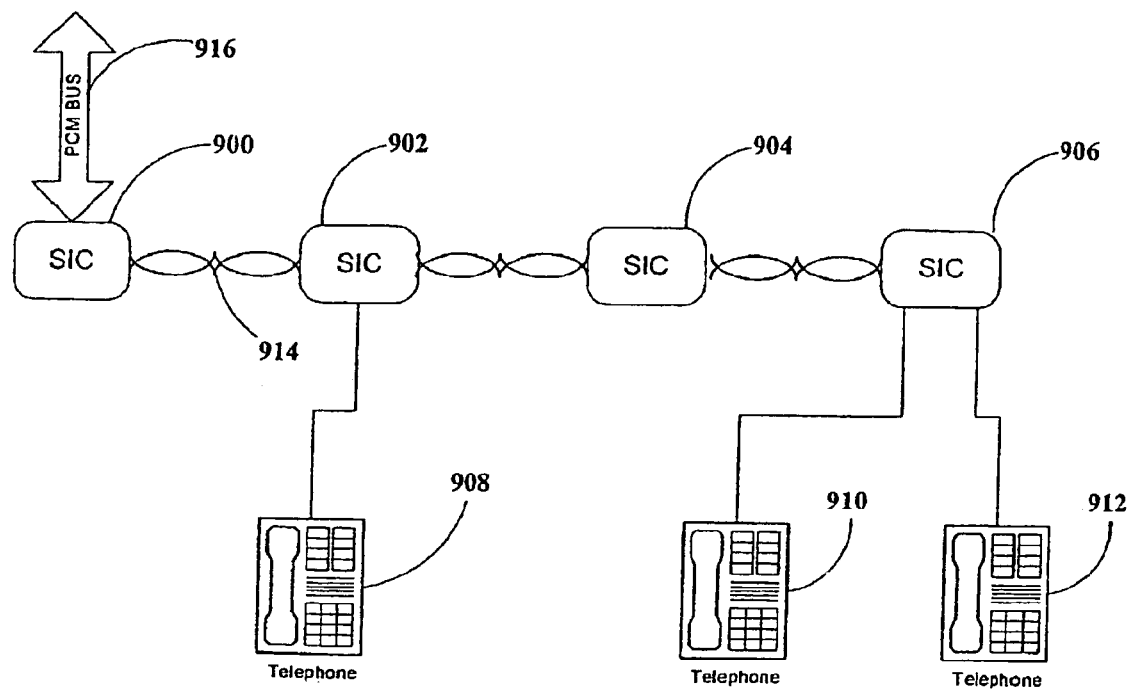
FIG. 9 shows a SIC-based multiplexer-PABX/PBX according to the present invention.

A network of SIC's may be used to implement a multiplexer or a PABX/PBX functionality, as illustrated in FIG. 9. In this example, a SIC 900 is connected to a high data rate connection, such as PCM bus 916, while SIC 902 and SIC 906 are connected to telephones 908, 910, and 912. SIC 904 functions as a repeater in this example.

In this example, the local area network functions as a multiplexer, wherein the bandwidth of the high data rate connection (PCM bus 916) is multiplexed through SIC 900 to SIC 902 and SIC 906, each of which may use a different portion of the bandwidth of the high data rate connection (PCM bus 916). Moreover, by the addition of telephones 908, 910, and 912, the local area network of FIG. 9 functions as a voice multiplexer.

Other Applications of the Invention

A number of applications of the present invention have been discussed above. Additional applications include, but are not limited to: intercom, PABX/PBX, security systems, video surveillance, entertainment broadcasting services, time (clock) distribution, and audio/video signal distribution. The networks implemented by the present invention can extend locally within a single building or over a neighborhood.

While the invention has been described with respect to a limited number of embodiments and applications, it will be appreciated that many variations, modifications and other applications of the invention may be made.

What is claimed is:

1. A service outlet for configuring a local area network, the network including a service wiring carrying frequency multiplexed service and data signals, the service outlet comprising:
a wiring connector to connect said outlet to the service wiring;
a modem coupled to said wiring connector for data signal communication with the service wiring;
a data interface coupled to said modem for connecting to a data processing unit, said data interface being configured for bidirectional data communication between said modem and the data processing unit; and
a single enclosure housing said wiring connector, said modem and said data interface, and wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to substitute for a standard outlet,
wherein said outlet is wall mountable and is addressable in the local area network.

2. The outlet according to claim 1, wherein:
the service wiring is one of: a twisted wire pair; a coaxial cable; and telephone wiring; and
said modem is configured to transmit data signals to, and receiving data signals from, the service wiring.

3. The outlet according to claim 1, wherein:
the service wiring is powerline wiring; and
said modem is configured to transmit data signals to, and receiving data signals from, the powerline wiring.

4. The outlet according to claim 3, wherein the service signal includes a telephone signal.

5. The outlet according to claim 1, wherein:
the service signal includes a power signal;
the service wiring is powerline wiring; and
said modem is configured to transmit data signals to, and receiving data signals from, the powerline wiring.

6. The outlet according to claim 1, further comprising a service connector coupled to said wiring connector and operative for connecting to a service appliance.

7. The outlet according no claim 1 further comprising a filter coupled between said wiring connector and said modem, the filter operative to pass only the data signal.

8. The outlet according to claim 1, wherein the outlet address is manually assigned.

9. The outlet according to claim 1, wherein the outlet address is automatically assigned.

10. The outlet according to claim 1, wherein the outlet address is assigned by a data unit connected no said outlet.

11. A device for configuring a network, the network including a service wiring carrying frequency multiplexed service and data signals, the service signal including a power signal, and the device comprising:
   a wiring connector to connect said device to the service wiring;
   a modem coupled to said wiring connector for data signal communication with the service wiring;
   a data interface coupled to said modem for connecting to a data unit, said data interface being configured for bidirectional data communication between said modem and the data unit; and
   a single enclosure housing said wiring connector, said modem and said data interface, and wherein said single enclosure is constructed to have at least one of the following:
   a form substantially similar to that of a standard outlet;
   wall mounting elements substantially similar to those of a standard wall outlet;
   a shape allowing direct mounting in an outlet opening or cavity; and
   a form to substitute for a standard outlet,
   wherein said device is addressable.

12. The device according to claim 11, wherein:
   the service wiring is one of: a twisted wire pair; a coaxial cable; and telephone wiring; and
   said modem is configured to transmit data signals to, and receiving data signals from, the service wiring.

13. The device according to claim 11, wherein the device is at least in part housed within a service outlet.

14. The device according to claim 11, wherein:
   the service wiring is powerline wiring; and
   said modem is configured to transmit data signals to, and receiving data signals from, the powerline wiring.

15. The device according to claim 11, wherein the service signal includes a telephone signal.

16. The device according to claim 11, further comprising a service connector coupled to said wiring connector and operative for connecting to a service appliance.

17. The device according to claim 11, further comprising a filter coupled between said wiring connector and said modem, the filter operative to pass only the data signal.

18. The device according to claim 11, wherein the device address is manually assigned.

19. The device according to claim 11, wherein the device address is automatically assigned.

20. The device according to claim 11, wherein the device address is assigned by a data unit connected to said device.

21. A system for configuring a data network, the system comprising:
   a service wiring carrying frequency multiplexed service and data signals; and
   at least two devices each connected to the service wiring, each couplable to a data unit, and each operative to establish data signal communication between the data unit and the service wiring,
   wherein at least one of said devices is attachable to a wall, and
   wherein at least one of the devices is addressable.

22. The system according to claim 21, wherein the service wiring is one of: a twisted wire pair; a coaxial cable; telephone wiring; and powerline wiring.

23. The system according to claim 21, wherein the service signal includes at least one of a power signal and a telephone signal.

24. The system according to claim 21, wherein at least one of said devices is at least in part integrated into an outlet.

25. The system according to claim 21, wherein at least one of said devices further comprises a service connector coupled to the service wiring and operative for connecting to a service appliance.

26. The system according to claim 21, wherein information carried by the data signal is used to control the service signal.

27. The system according to claim 21, wherein the data signal is used to monitor the service signal.

28. The system according to claim 21, wherein at least two of the devices are addressable.

29. The system according to claim 21, and a single enclosure enclosing at least one of said devices, wherein said single enclosure is constructed to have at least one of the following:
   a form substantially similar to that of a standard outlet; wall mounting elements substantially similar to those of a standard wall outlet;
   a shape allowing direct mounting in an outlet opening or cavity; and
   a form to substitute for a standard outlet.

30. An outlet for coupling digital data carried over local area network (LAN) wiring to at least one data unit, the wiring having at least two conductors that simultaneously carry a bidirectional serial digital data signal containing the digital data and a DC power signal over the same conductors, said outlet comprising:
   a wiring connector to connect to the LAN wiring;
   a first LAN transceiver coupled to said wiring connector and operative for transmitting and receiving the bidirectional serial digital data signal over the LAN wiring;
   a DC to DC converter coupled between said wiring connector and said first LAN transceiver to be fed from the DC power signal carried over the LAN wiring and to supply DC power to said first LAN transceiver;
   a first data port coupled to said first LAN transceiver for bidirectional communication of the serial digital data signal with the at least one data unit;
   a visual indicator to indicate a status, said visual indicator connected to said DC to DC converter to be supplied with power from the DC power signal; and
   a single enclosure housing said wiring connector, said first LAN transceiver, said visual indicator, said DC to DC converter and said first data port,
   wherein said enclosure is dimensioned to be mountable into a standard wall outlet receptacle or a wall outlet opening, said outlet is addressable in the LAN, and at least part of the digital data contained in the digital data signal is transparently passed between the at least one data unit and the LAN wiring.

31. The outlet according to claim 30, further operative for wired connection to the at least one data unit, wherein:
   said first data port comprises a LAN connector for wired connection to a data unit;
   said outlet further comprises, in said single enclosure, a second LAN transceiver connected between said first LAN transceiver and said LAN connector;
   said second LAN transceiver is operative to engage in full-duplex packet-based point-to-point serial digital data communication with the at least one data unit; and
   said second LAN transceiver is further connected to be supplied with power from said DC to DC converter.

32. The outlet according to claim 31, wherein said second LAN transceivers is operative to conduct full-duplex point-to-point communication with a single other mating transceiver.

33. The outlet according to claim 30, wherein: the at least one data unit includes first and second data units; the LAN wiring carries time multiplexed first and second digital data signals; said outlet is further operative to couple each of the first and second digital data signals to a respective one of the first and second data units; said first data port is couplable to the first data unit; and said outlet further comprises:
- a second data port to enable bidirectional serial digital data communicating with the second data unit; and
- a time multiplexer/demultiplexer coupled between said first LAN transceiver, said first data port and said second data port, said time multiplexer/demultiplexer being operative to pass the first digital data signal between said wiring connector and the first data unit and to pass the second digital data signal between said wiring connector and the second data unit.

34. The outlet according to claim 30, wherein said outlet has one of: a manually assigned address; an automatically assigned address; and an address assigned by a data unit connected to said outlet.

35. The outset according to claim 30, wherein said first LAN transceiver is operative to conduct bidirectional communication with one or more substantially similar transceivers over the LAN wiring.

36. The outlet according to claim 30, wherein said first LAN transceiver is operative to conduct full-duplex point-to-point communication with a single mating transceiver over the LAN wiring.

37. The outlet according to claim 30, wherein the serial digital data signal conforms to an Ethernet standard.

38. The outlet according to claim 30, further comprising firmware and a processor executing said firmware, wherein said processor is connected to said DC to DC converter to be supplied with power from the DC cower signal, and wherein the serial digital data signal is couplable to said processor via said wiring connector.

39. The outlet according to claim 30, wherein said single enclosure is constructed to have at least one of the following:
- a form substantially similar to that of a standard outlet; wall mounting elements substantially similar to those of a standard wall outlet;
- a shape allowing direct mounting in an outlet opening or cavity; and
- a form to substitute for a standard outlet.

40. The outlet according to claim 30, wherein said outlet is pluggable into an existing outlet or attachable to an existing outlet.

41. The outlet according to claim 30, further comprising a separator to separate the digital data signal from the DC power signal, connected between said wiring connector, said DC to DC converter and said first LAN transceiver.

42. The outlet according to claim 41, wherein said separator means separator is based on one or more center-tapped transformers connected to substantially transparently pass the digital data signal.

43. An outlet for coupling digital data to a first data unit, the digital data being carried over wiring having at least two conductors that simultaneously carry the digital data in a bidirectional serial digital data signal and a DC power signal over the same conductors, said outlet comprising:
- a wiring connector to connect to the wiring;
- a modem coupled to said wiring connector and operative for transmitting and receiving the bidirectional serial digital data signal over the wiring;
- a LAN connector to connect to the first data unit;
- a LAN transceiver connected between said LAN connector and said modem for full-duplex point-to-point serial digital data communication with said first data unit;
- a DC to DC converter coupled between said wiring connector, said modem and said LAN transceiver to be supplied with power from the DC power signal and to supply DC power to said modem and said LAN transceiver;
- a visual indicator to indicate a status, connected to said DC to DC converter to be supplied with power from the DC power signal; and
- a single enclosure housing said wiring connector, said modem, said LAN transceiver, said visual indicator and said DC to DC converter,
- wherein: said enclosure is dimensioned to be mountable into a standard wall outlet receptacle or a wall outlet opening; said outlet is addressable in a LAN; and at least part of the digital data is transparently passed between the first data unit and the wiring.

44. The outlet according to claim 43, wherein: the wiring is connected to carry time multiplexed first and second digital data signals; said outlet is further operative to respectively couple the first digital data signal to the first data unit and to couple the second digital data signal to a second data unit; said first LAN connector and said LAN transceiver are connected to communicate with the first data unit; and said outlet further comprises:
- a second LAN connector to connect to the second data unit;
- a second LAN transceiver connected between said second LAN connector and said modem for full-duplex point-to-point serial digital data communicating with the second data unit; and
- a time multiplexer/demultiplexer coupled between said modem, said first LAN transceiver and said second LAN transceiver, said time multiplexer/demultiplexer being operative to pass the first digital data signal between said wiring connector and the first data unit and to pass the second digital data signal between said wiring connector and the second data unit.

45. The outlet according to claim 43, wherein said outlet has one of: a manually assigned address; an automatically assigned address; and an address assigned by a data unit connected to the outlet.

46. The outlet according to claim 43, wherein the serial digital data signal conforms to an Ethernet standard.

47. The outlet according to claim 43, further comprising firmware and a processor executing said firmware, wherein said processor is connected to said DC to DC converter to be supplied with power from the DC power signal, and wherein the serial digital data signal is couplable to said processor via said wiring connector.

48. The outlet according to claim 43, wherein said single enclosure is constructed to have at least one of the following:
- a form substantially similar to that of a standard outlet; wall mounting elements substantially similar to those of a standard wall outlet;
- a shape allowing direct mounting in an outlet opening or cavity; and
- a form to substitute for a standard outlet.

49. The outlet according to claim 43, wherein said outlet is pluggable into an existing outlet or attachable to an existing outlet.

50. The outlet according to claim 43, further comprising a separator to separate the digital data signal from the DC power signal, connected between said wiring connector, said DC to DC converter and said modem.

51. The outlet according to claim 50, wherein the digital data signal and the DC power signal are carried using frequency division multiplexing wherein the digital data signal is carried in a frequency band higher than DC, and said outlet further comprises:
a high pass filter connected between aid wiring connector and said modem for substantially passing only the digital data signal and substantially blocking the DC power signal; and
a low pass filter connected between said wiring connector and said DC to DC converter for substantially passing only the DC power signal.

52. The outlet according no claim 43, wherein the wiring consists of a single wire pair, and said modem is operative to transmit and receive over the single wire pair.

53. The outlet according to claim 52, wherein wiring consists of a single analog telephone wire pair, and said modem is operative to transmit and receive over the single telephone wire pair.

54. An outlet for coupling digital data carried over local area network (LAN) wiring to at least one data unit, the wiring having at least two conductors that simultaneously carry a bidirectional serial digital data signal containing the digital data and a DC power signal over the same conductors, said outlet comprising:
a wiring connector to connect to the LAN wiring;
a first LAN transceiver coupled to said wiring connector and operative for transmitting and receiving the bidirectional serial digital data signal over the LAN wiring;
a DC to DC converter coupled between said wiring connector and said first LAN transceiver to be supplied with power from the DC power signal carried over the LAN wiring and for supplying DC power to said outlet;
a first data port coupled to said first LAN transceiver for bidirectional serial digital data communication with the at least one data unit;
a visual indicator to indicate a status connected to said DC to DC converter to be supplied with power from the DC power signal; and
a single enclosure dimensioned to be mountable into a standard wall outlet receptacle or a wall outlet opening, said single enclosure housing said wiring connector, said visual indicator, said first LAN transceiver, said DC to DC converter and said first data port,
wherein at least part of the digital data is transparently passed between the at least one data unit and the LAN wiring.

55. The outlet according to claim 54 further operative for wired connection to the at least one data unit, wherein said first data port comprises a LAN connector for wired connection to the at least one data unit, and said outlet further comprises, in said single enclosure, a second LAN transceiver connectable between the first LAN transceiver and said LAN connector, said second LAN transceiver being operative for full-duplex packet-based point-to-point serial digital data communication with the at least one data unit, and wherein said second LAN transceiver is further connected to be supplied with power from said DC to DC converter.

56. The outlet according to claim 55, wherein said first and second LAN transceivers are operative to conduct full-duplex point-to-point communication with a respective single other mating transceiver.

57. The outlet according to claim 54, wherein the at least one data unit includes first and second data units, the wiring is connectable to carry time multiplexed first and second digital data signals, and said outlet is further operative to couple each of the first and second digital data signals to a respective one of the first and second data units, said first data port is couplable to the first data unit, and said outlet further comprises:
a second data port to enable bidirectional serial digital data communicating with the second data unit; and
a time multiplexer/demultiplexer couplable between the first LAN transceiver, said first data port and said second data port, said time multiplexer/demultiplexer being operative to pass the first digital data signal between said wiring connector and the first data unit and to pass the second digital data signal between said wiring connector and the second data unit.

58. The outlet according to claim 54, wherein said outlet is addressable in a LAN and said outlet has an address that is manually assigned, or automatically assigned, or assigned by a data unit connected to said outlet.

59. The outlet according to claim 54, wherein the serial digital data signal conforms to an Ethernet standard.

60. The outlet according to claim 54, further comprising firmware and a processor executing said firmware, wherein said processor is connected to said DC to DC converter to be supplied with power from the DC power signal, and the serial digital data signal is coupled to said processor via said wiring connector.

61. The outlet according to claim 54, wherein said single enclosure is constructed to have at least one of the following:
a form substantially similar to that of a standard outlet; wall mounting elements substantially similar to those of a standard wall outlet;
a shape allowing direct mounting in an outlet opening or cavity; and
a form to substitute for a standard outlet.

62. The outlet according to claim 54, wherein said outlet is pluggable into an existing outlet or attachable to an existing outlet.

63. The outlet according to claim 54, further comprising a separator connected between said wiring connector, said DC to DC converter and said first data port for separating the digital data signal from the DC power signal.

64. The outlet according to claim 63, wherein said separator is based on one or more center-tapped transformers connected to substantially transparently pass the digital data signal.

65. An outlet for coupling a data unit and an analog unit to wiring that simultaneously carries a bidirectional serial digital data signal multiplexed with an analog signal, the outlet comprising:
a wiring connector operative to connect said outlet to the wiring;
a data interface connector coupled to said wiring connector and connectable to the data unit, for coupling the serial digital data signal to the data unit;
an analog connector coupled to said wiring connector and connectable to the analog unit, for coupling the analog signal to the analog unit; and
a single enclosure dimensioned to be mountable into a standard outlet receptacle or opening, said single enclosure housing said wiring connector.

66. The outlet according to claim 65, wherein the wiring is one of: a twisted wire pair, a coaxial cable, a telephone wire-pair and powerline wiring, and said wiring connector is adapted to connect to the wiring.

67. The outlet according to claim 65, further comprising at least one active device, and wherein said outlet further comprises a power supply connected to said at least one active device for DC powering said at least one active device, said power supply having a connection point for connecting to a power source, and said outlet further comprises a visual indicator coupled to said power supply for indicating a status.

68. The outlet according to claim 67 further comprising a power connector connectable to the power source, and wherein said connection point is coupled no said power connector for powering the power supply from the power source.

69. The outlet according to claim 67 wherein the wiring further simultaneously carries a power signal, and wherein said connection point is coupled to said wiring connector for supplying power to said outlet from the power signal.

70. The outlet according to claim 67 wherein said power supply comprises an AC/DC converter or a DC/DC converter.

71. The outlet according to claim 67 further comprising a power connector coupled to said power supply and connectable to a device for DC powering the device.

72. The outlet according to claim 65, wherein:
the analog signal and the digital data signal are carried frequency multiplexed;
the digital data signal is carried in a frequency band distinct from, and higher than, the analog signal, and said outlet further comprises:
a high pass filter coupled between said wiring connector and said data interface connector for passing only the digital data signal; and
a low pass filter coupled between said wiring connector and said analog connector for passing only the analog signal.

73. The outlet according to claim 65, wherein said outlet is further addressable in a network.

74. The outlet according to claim 73, wherein said outlet has a manually assigned address.

75. The outlet according to claim 73, wherein said outlet has an automatically assigned address.

76. The outlet according to claim 73, wherein said outlet has an address assigned by a data unit connected to the outlet.

77. The outlet according to claim 65, further comprising a transceiver coupled between said wiring connector and said standard data interface connector, said transceiver being operative to effect full-duplex serial digital data communication over the wiring.

78. The outlet according to claim 77, wherein said transceiver is operative to bidirectionally communicate with one or more identical transceivers over the wiring.

79. The outlet according to claim 77, wherein said transceiver is operative to bidirectionally communicate point-to-point with only a single mating transceiver over the wiring.

80. The outlet according to claim 65, wherein said communication with the data unit conforms to an Ethernet protocol.

81. The outlet according to claim 65, wherein said least one parameter if the outlet is configurable by a connected data unit.

82. The outlet according to claim 65 further comprising firmware and a processor executing said firmware, the processor coupled to the wiring connector to control the outlet.

83. The outlet according to claim 65, wherein said single enclosure is constructed to have at least one of the following:
a form substantially similar to that of a standard outlet; wall mounting elements substantially similar to those of a standard wall outlet;
a shape allowing direct mounting in an outlet opening or cavity; and
a form to substitute for a standard outlet.

84. An outlet for coupling a data unit and a powered unit to wiring composed of at least two conductors and simultaneously carrying bidirectional serial digital data and power signals, said outlet comprising:

a wiring connector operative to connect said outlet to the wiring;
a data connector coupled to said wiring connector and connectable to a data unit, for coupling the serial digital data signal to the data unit;
a power connector coupled to said wiring connector and connectable to a powered unit, for powering the powered unit by the power signal; and
a single enclosure housing said wiring connector, said data connector and said power connector,
wherein said enclosure is dimensioned to be mountable into a standard outlet receptacle or opening, and the outlet is further addressable in the network, and wherein said outlet further comprises at least one active device, and wherein said outlet further comprises a power supply connected to said at least one active device for DC powering said at least one active device, said power supply being coupled to said wiring connector for being powered by the power signal, and said outlet further comprises a visual indicator coupled to said power supply for indicating a status.

85. The outlet according to claim 84, wherein the wiring is one of: a twisted wire pair; a coaxial cable; a telephone wire pair; and powerline wiring, and said wiring connector is adapted to connect to the wiring.

86. The outlet according to claim 84 wherein said power supply comprises an AC/DC converter.

87. The outlet according to claim 84 wherein said power supply comprising a DC/DC converter.

88. The outlet according to claim 84 wherein the digital data and power signals are each carried over distinct and dedicated wires.

89. The outlet according to claim 84 wherein the digital data and power signals are multiplexed and carried over the same conductors.

90. The outlet according to claim 89 further comprising a data/power splitter having first, second and third ports, wherein only power is passed from said first port to said second port and the digital data signal is passed between said first and third ports.

91. The outlet according to claim 90 further wherein said data/power splitter is based on a split-tapped transformer.

92. The outlet according to claim 84, wherein the outlet address is manually assigned.

93. The outlet according to claim 84, wherein the outlet address is automatically assigned.

94. The outlet according to claim 84, wherein the outlet address is assigned by a data unit connected to the outlet.

95. The outlet according to claim 84, further comprising a transceiver coupled between said wiring connector and data connector, for conducting the serial digital data signal over the wiring.

96. The outlet according to claim 95, wherein said transceiver is operative to bidirectionally communicate with one or more identical transceivers over the wiring.

97. The outlet according to claim 95, wherein said transceiver is operative to perform bidirectional point-to-point communication with only a single mating transceiver over the wiring.

98. The outlet according to claim 84, further comprising a transceiver coupled between said wiring connector and said data connector, said transceiver being operative to perform full-duplex digital data communication with the data unit.

99. The outlet according to claim 84, wherein communication with said data unit is Ethernet based.

100. The outlet according to claim 84, wherein au least one parameter of the outlet is configurable by a connected data unit.

101. The outlet according to claim 84 further comprising firmware and a processor executing said firmware, said processor being coupled to said wiring connector for coupling to the serial digital data.

102. The outlet according to claim 84 wherein the wiring is a powerline wiring, the power signal is an AC power signal, and said power connector is an AC power connector.

103. The outlet according to claim 84 wherein the wiring comprises at least one twisted pair and wherein the power signal is a DC power signal.

104. The outlet according to claim 84, wherein said single enclosure is constructed to have at least one of the following:
 a form substantially similar to that of a standard outlet;
 wall mounting elements substantially similar to those of a standard wall outlet;
 a shape allowing direct mounting in an outlet opening or cavity; and
 a form to substitute for a standard outlet.

105. An outlet for coupling a data unit and an analog telephone set to wiring that simultaneously carries a bidirectional serial digital data signal multiplexed with a telephone signal, the outlet comprising:
 a wiring connector operative to connect said outlet to the wiring;
 a data interface connector coupled to said wiring connector and connectable to the data unit, for coupling the serial digital data signal to the data unit;
 a telephone connector coupled to said wiring connector and connectable to the analog telephone set, for coupling the telephone signal to the telephone set; and
 a single enclosure housing said wiring connector, said data interface connector and said telephone connector,
 wherein said enclosure is dimensioned to be mountable into a standard outlet receptacle or opening, and said single enclosure is constructed to have at least one of the following:
  a form substantially similar to that of a standard outlet;
  wall mounting elements substantially similar to those of a standard wall outlet;
  a shape allowing direct mounting in an outlet opening or cavity; and
  a form to substitute for a standard outlet.

106. The outlet according to claim 105, wherein the wiring is one of: a twisted wire pair, a coaxial cable, a telephone wire-pair and powerline wiring, and said wiring connector is adapted to connect to the wiring.

107. The outlet according to claim 105, further comprising at least one active device, and wherein said outlet further comprises a power supply connected to said at least one active device for DC powering said at least one active device, said power supply having a connection point to connect to a power source, and said outlet further comprises a visual indicator coupled to said power supply for indicating a status.

108. The outlet according to claim 107 further comprising a power connector connectable to the power source, and wherein said connection point is coupled to said power connector for supplying power to said outlet from the power source.

109. The outlet according to claim 107 wherein the wiring further simultaneously carries a power signal, and wherein said connection point is coupled to said wiring connector for supplying power to said outlet from the power signal.

110. The outlet according to claim 107 wherein said power supply comprises an AC/DC converter or a DC/DC converter.

111. The cutlet according to claim 107 further comprising a cower connector coupled to said connection point and connectable to a device for DC powering the device.

112. The outlet according to claim 105, wherein at least one parameter of the outlet is configurable by a connected data unit.

113. A device for configuring a network, the network including a service wiring carrying frequency multiplexed service and data signals, the device comprising:
 a wiring connector to connect said device to the service wiring;
 a modem coupled to said wiring connector for data signal communication with the service wiring; and
 a data interface coupled to said modem for connecting to a data unit, said data interface being configured for bidirectional data communication between said modem and the data unit,
 wherein said device is addressable, and the service signal includes a power signal, and said device further comprises a service connector coupled to said wiring connector and operative for connecting to a service appliance, and wherein said single enclosure is constructed to have at least one of the following:
  a form substantially similar to that of a standard outlet;
  wall mounting elements substantially similar to those of a standard wall outlet;
  a shape allowing direct mounting in an outlet opening or cavity; and
  a form to substitute for a standard outlet.

114. A device for configuring a network, the network including a service wiring carrying frequency multiplexed service and data signals, the device comprising:
 a wiring connector to connect said device to the service wiring;
 a modem coupled to said wiring connector for data signal communication with the service wiring; and
 a data interface coupled to said modem for connecting to a data unit, said data interface being configured for bidirectional data communication between said modem and the data unit,
 wherein said device is addressable, and the service signal includes a power signal, and said device further comprises a filter coupled between said wiring connector and said modem, the filter operative to pass only the data signal, and wherein said single enclosure is constructed to have at least one of the following:
  a form substantially similar to that of a standard outlet;
  wall mounting elements substantially similar to those of a standard wall outlet;
  a shape allowing direct mounting in an outlet opening or cavity; and
  a form to substitute for a standard outlet.

115. A device for configuring a network, the network including a service wiring carrying frequency multiplexed service and data signals, the device comprising:
 a wiring connector to connect said device to the service wiring;
 a modem coupled to said wiring connector for data signal communication with the service wiring; and
 a data interface coupled to said modem for connecting to a data unit, said data interface being configured for bidirectional data communication between said modem and the data unit,
 wherein said device is addressable, and the service signal includes a power signal, and said device further comprises a single enclosure housing said wiring connector, said modem and said data interface, and wherein said single enclosure is constructed to have at least one of the following:
- a form substantially similar to that of a standard outlet;
- wall mounting elements substantially similar to those of a standard wall outlet;
- a shape allowing direct mounting in an outlet opening or cavity; and
- a form to substitute for a standard outlet.

116. A device that configures a local area network, the device comprising:
- first and second ports each providing an interface to a respective one of first and second signal paths;
- first and second data couplers each coupled to a respective one of said first and second ports, and each having a data signal port operative to pass only a data signal;
- first and second modems each coupled to said data signal port of a respective one of said first and second data couplers, and said first and second modems configured to enable full duplex data signal communication with a respective one of said first and second signal paths;
- at least one data interface connector coupled to at least one of said modems and operative to establish a data signal connection with a data terminal equipment unit;
- first and second power couplers each coupled to a respective one of said first and second ports, and each having a respective one of first and second power signal ports, each signal port being operative to pass only a power signal, and the second power signal port being coupled to the first power signal port; and
- a power supply coupled to the first power signal port and to at least one of said modems to be powered by the power signal and to power said modem,
- wherein the device is configured to allow the communication of a data signal over the first signal path to be independent of the communication of a data signal over the second signal path.

117. The device according to claim 116 further comprising a power connector connectable to a power source for receiving power from the power source.

118. The device according to claim 116 wherein the power signal is a direct current signal.

119. The device according to claim 116 wherein the device has an address.

120. The device according to claim 119 wherein the address is assigned by a data terminal equipment unit connectable to the device.

121. The device according to claim 116 wherein the device is addressable in the local area network.

122. The device according to claim 116 wherein at least one of the couplers comprises a center tap transformer.

123. The device according to claim 116 wherein at least some of the couplers include center tap transformers.

124. A device that couples a digital data signal to a data unit, the device comprising:
- a coaxial connector capable of connecting the device to a coaxial cable;
- a filter having a data signal port and coupled to said coaxial connector, said filter configured to act upon a frequency multiplexed analog service signal plus digital data signal received by the device, and pass only a digital data signal via said data signal port;
- a modem coupled to said data signal port to enable full duplex digital data signal communication with one or more additional modems over the coaxial cable;
- a data connector to connect to the data unit;
- a data transceiver coupled between said data connector and said modem, said data transceiver operative to effect full-duplex serial digital data communication with the data unit;
- a power port connectable to a power signal;
- a power supply coupled between said power port and said modem to provide DC powering of said modem from said power signal; and
- a single enclosure housing said filter, said power supply, said modem and said data connector,
- wherein the device is addressable in the local area network.

125. The device according to claim 124 wherein the device has an automatically assigned address.

126. The device according to claim 124 wherein the device has an address assigned by a data terminal equipment unit connectable to the device.

127. The device according to claim 124 wherein the device is at least in part housed in an outlet.

128. The device according to claim 124 further comprising a second data connector coupled to said modem for connecting to a second data unit for bidirectional communication with the second data unit.

* * * * *